March 28, 1950     O. KENDALL ET AL     2,502,011
SOUND MOTION-PICTURE PROJECTOR
Filed Feb. 26, 1947     13 Sheets-Sheet 1
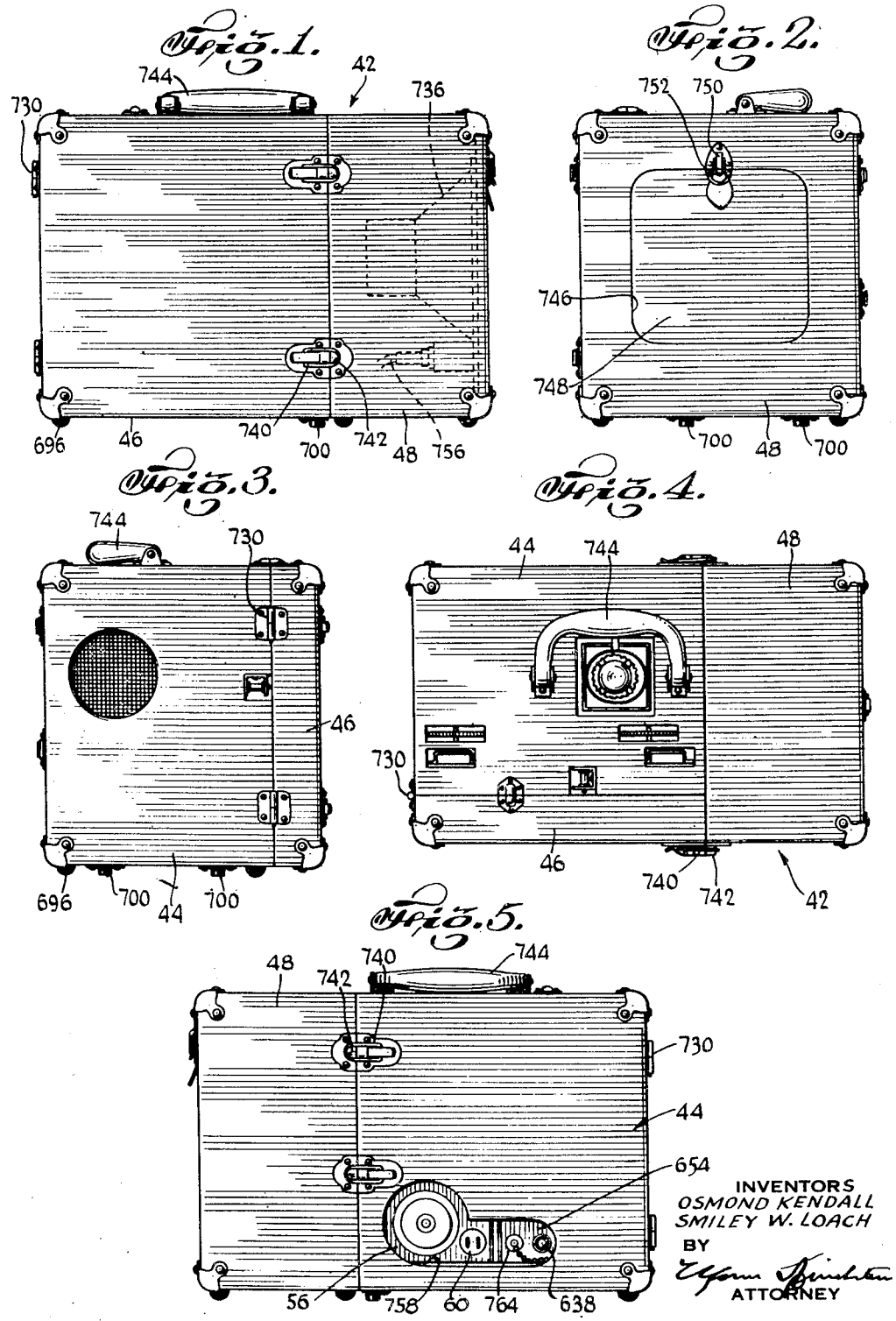
INVENTORS
OSMOND KENDALL
SMILEY W. LOACH
BY
ATTORNEY

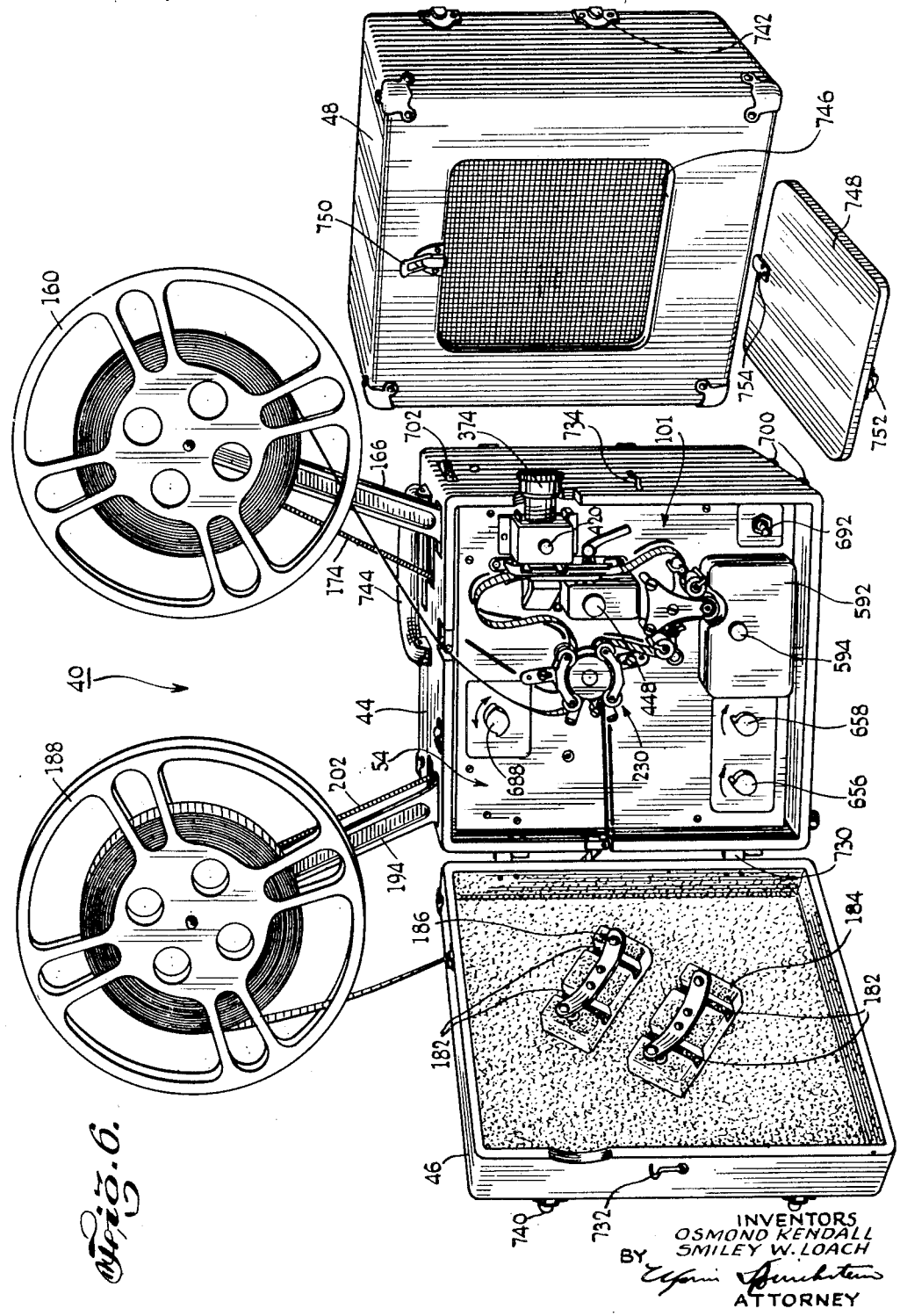

March 28, 1950     O. KENDALL ET AL     2,502,011
SOUND MOTION-PICTURE PROJECTOR
Filed Feb. 26, 1947                 13 Sheets-Sheet 3

INVENTORS
OSMOND KENDALL
SMILEY W. LOACH
BY
ATTORNEY

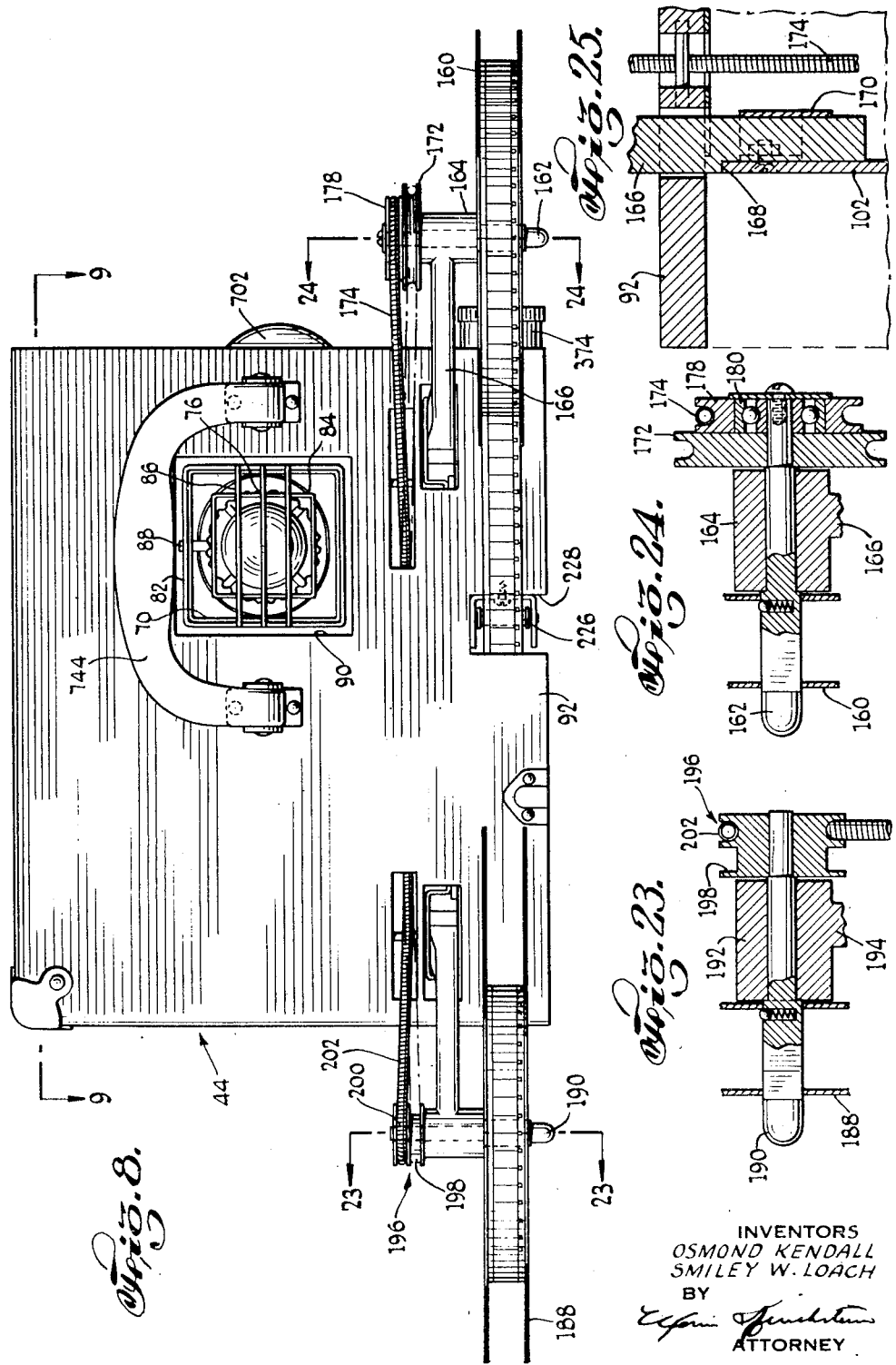

March 28, 1950  O. KENDALL ET AL  2,502,011
SOUND MOTION-PICTURE PROJECTOR
Filed Feb. 26, 1947  13 Sheets-Sheet 5
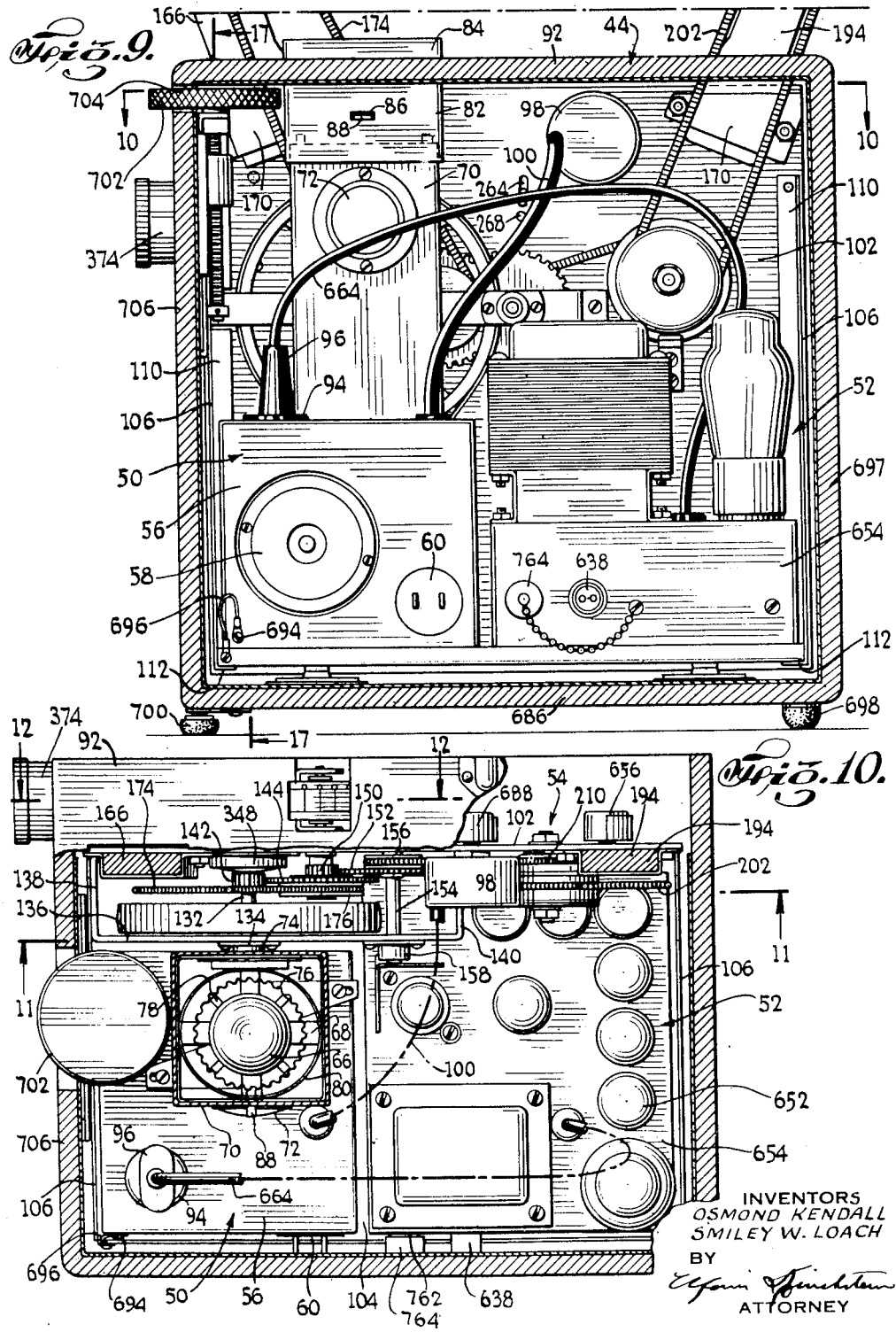
INVENTORS
OSMOND KENDALL
SMILEY W. LOACH
BY
ATTORNEY

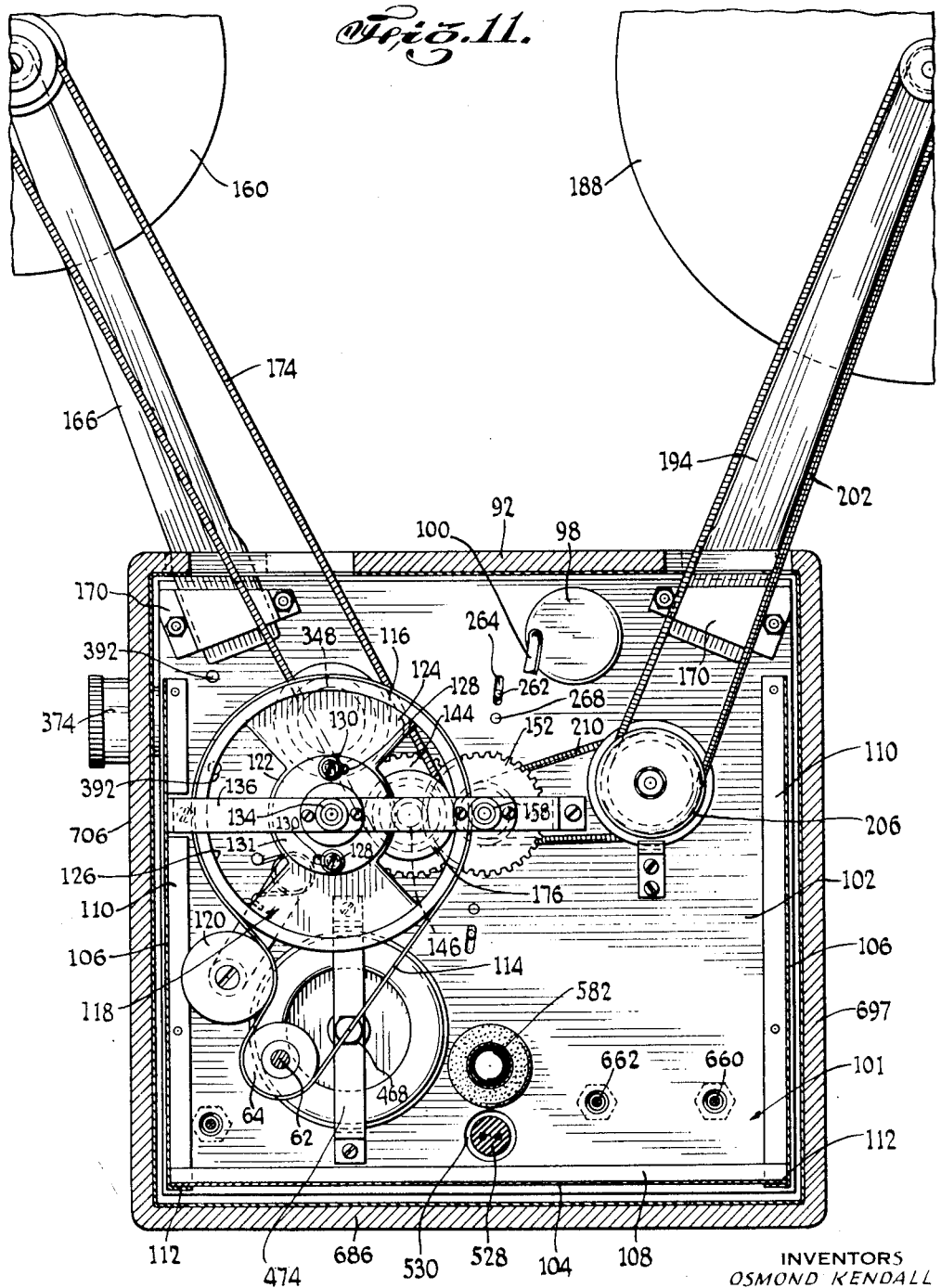

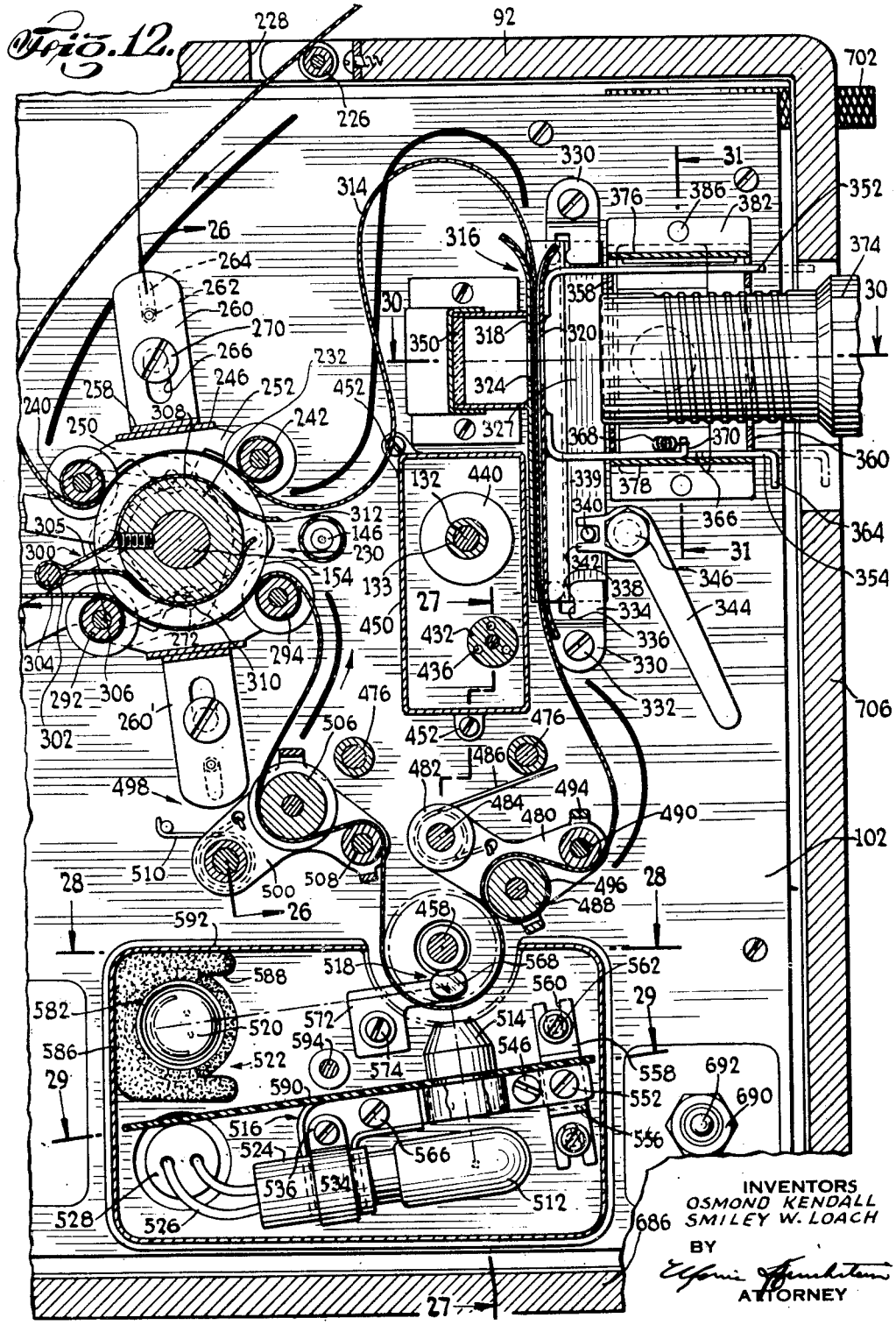

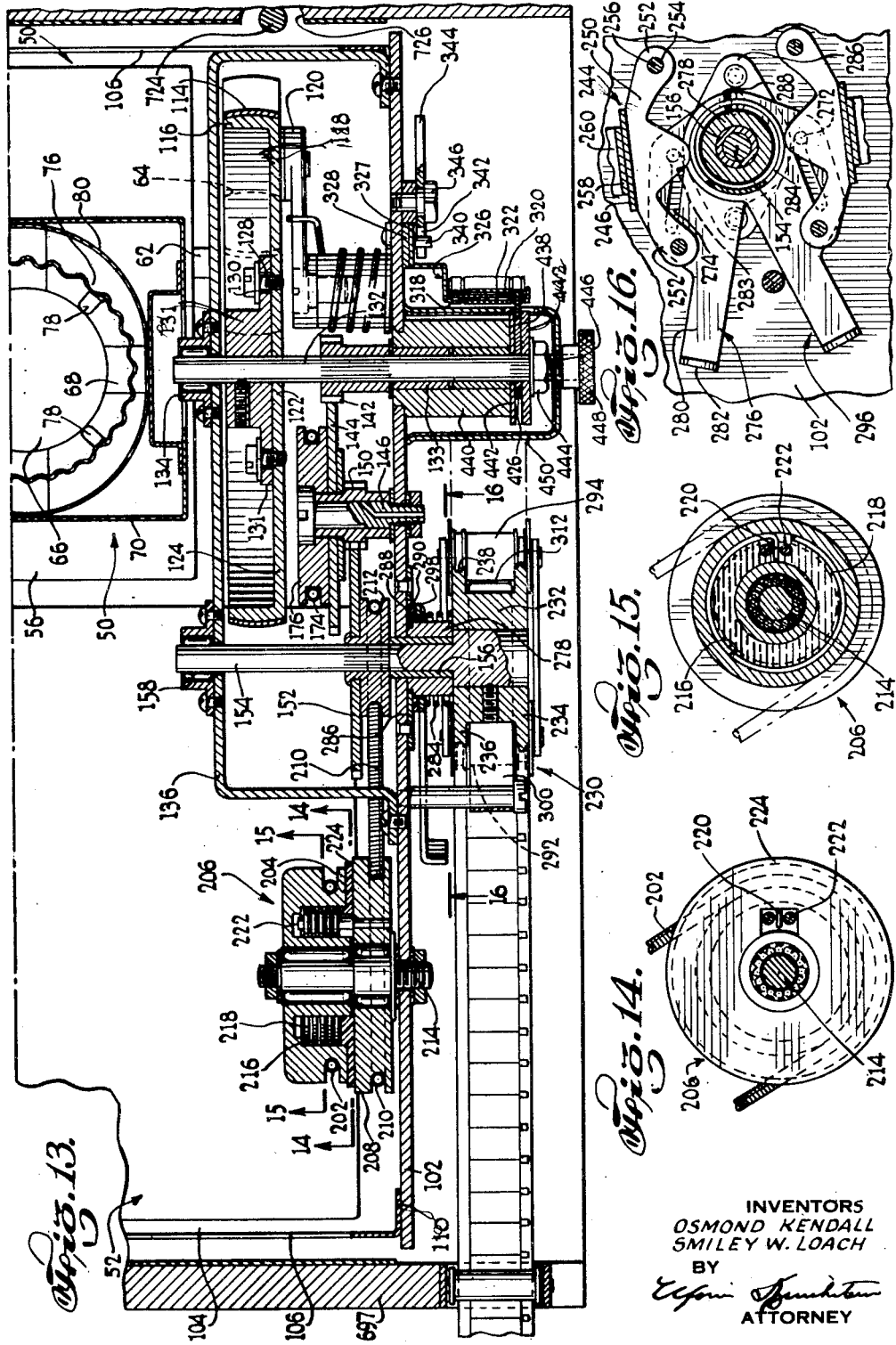

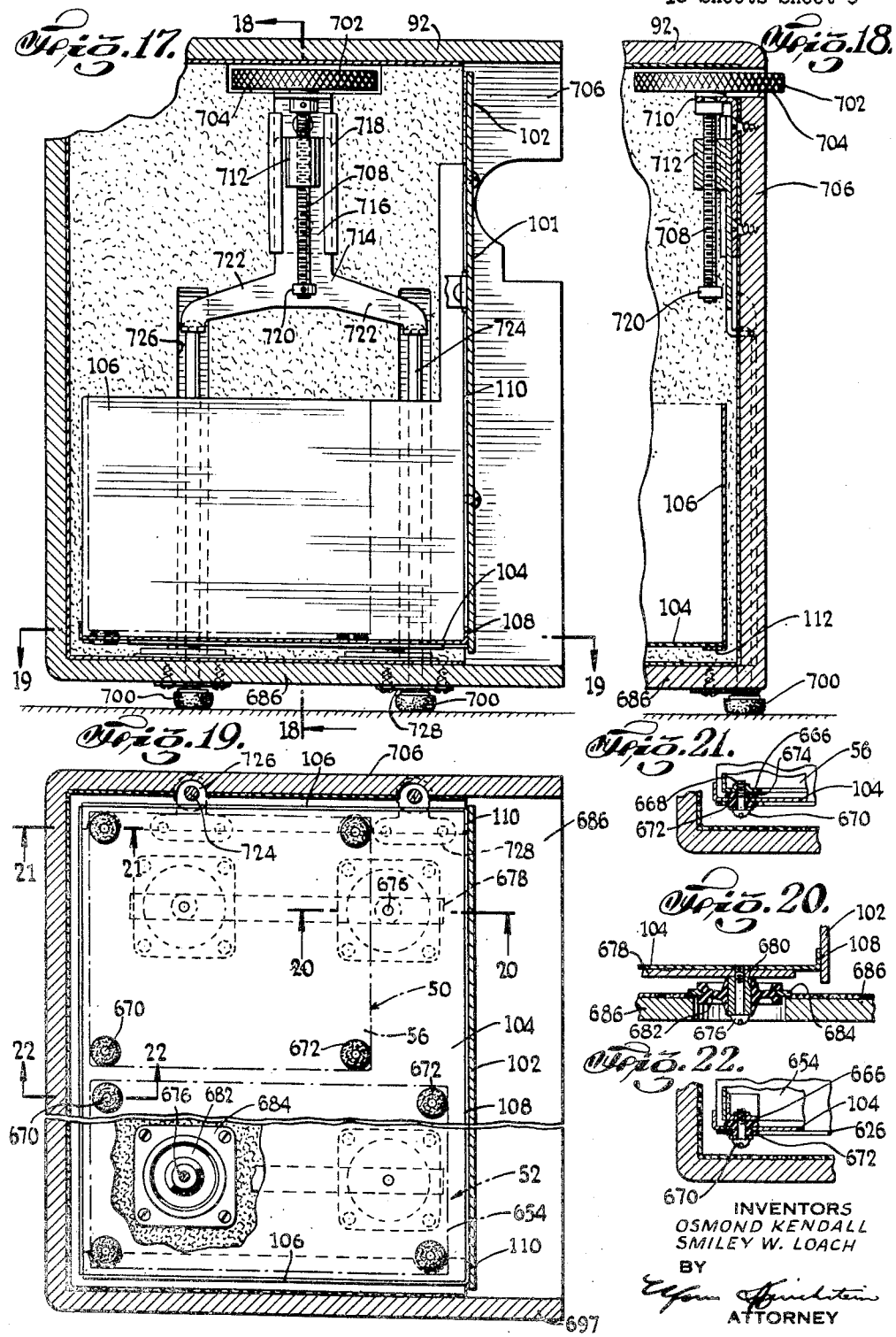

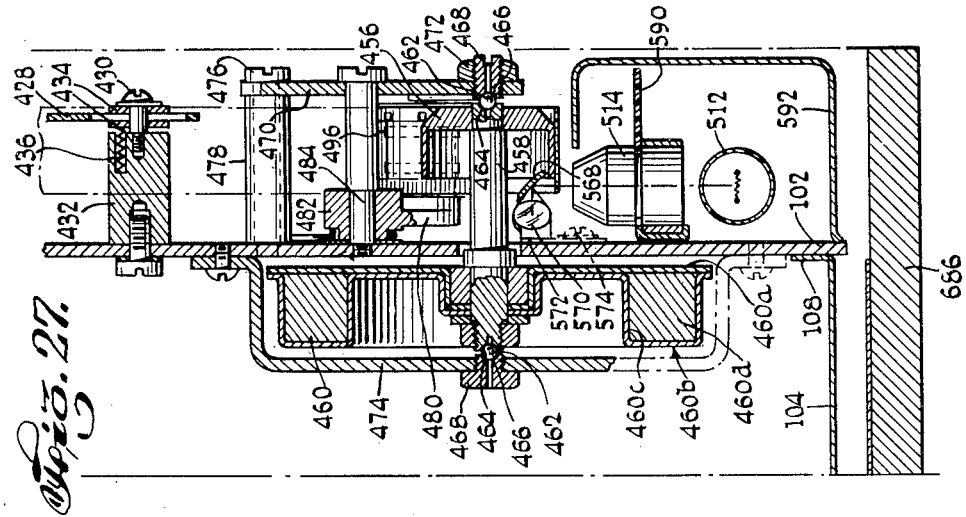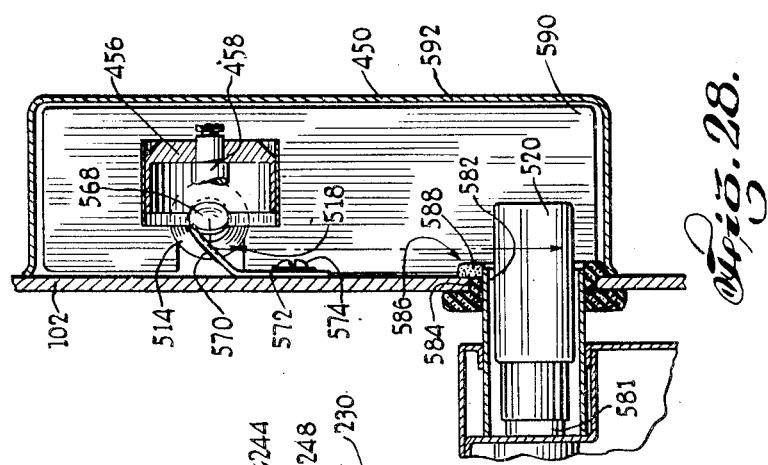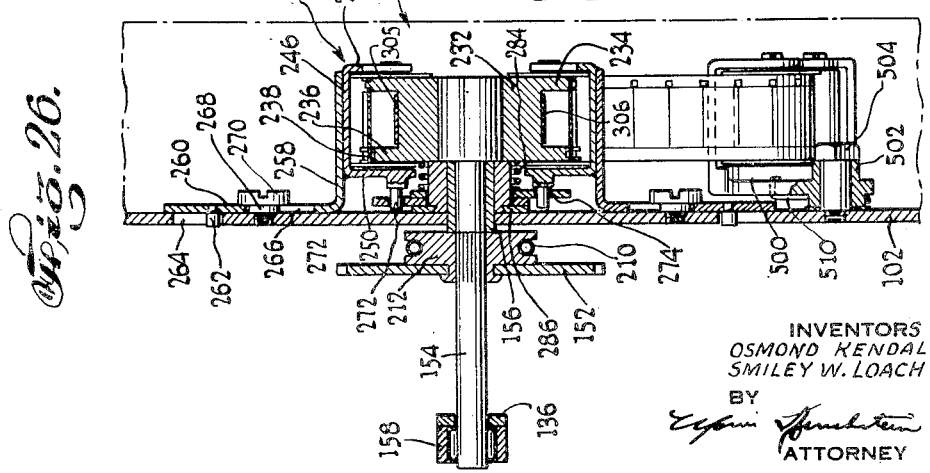

March 28, 1950     O. KENDALL ET AL     2,502,011
SOUND MOTION-PICTURE PROJECTOR
Filed Feb. 26, 1947     13 Sheets-Sheet 11
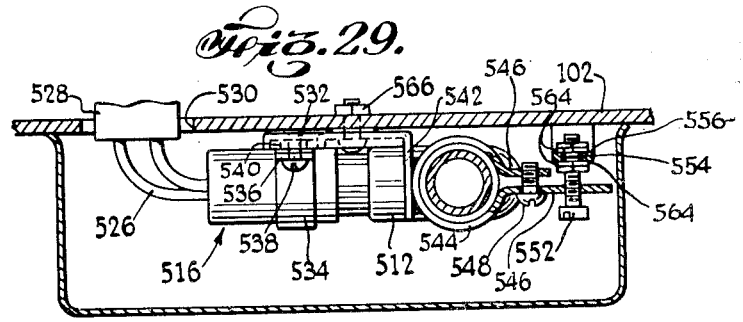
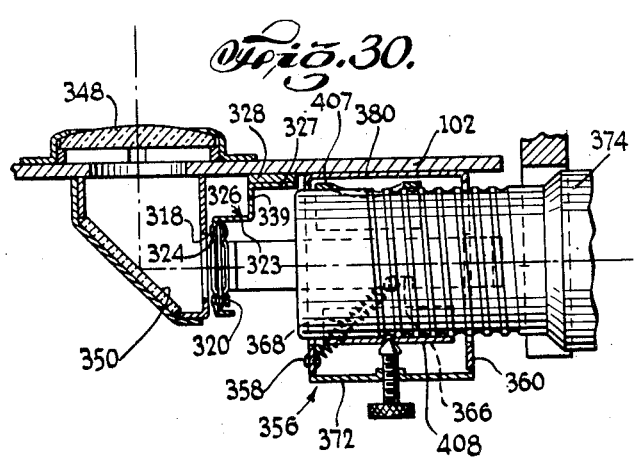
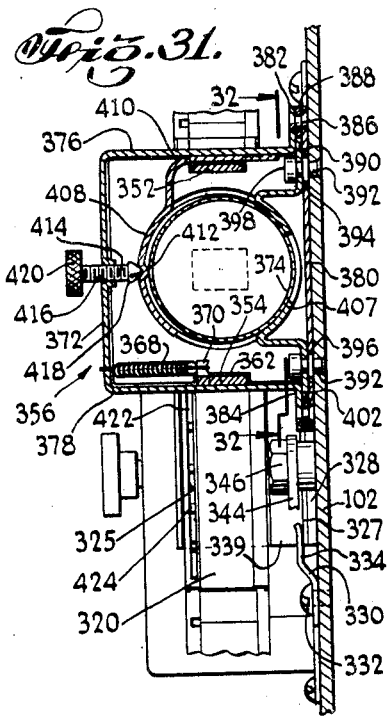
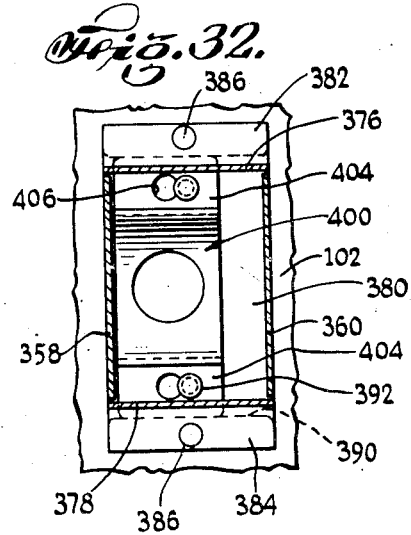
INVENTORS
OSMOND KENDALL
SMILEY W. LOACH
BY
ATTORNEY

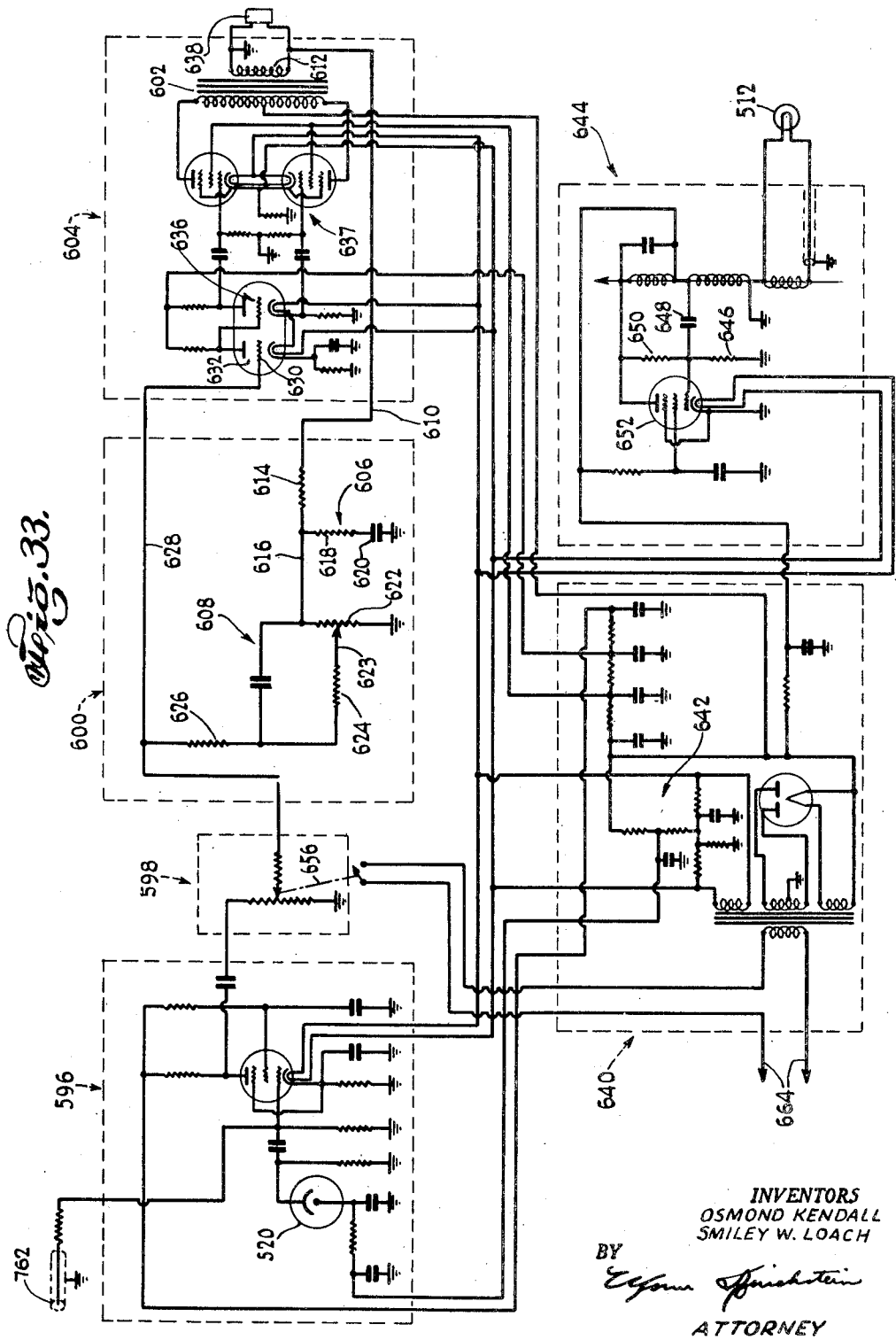

March 28, 1950     O. KENDALL ET AL     2,502,011
SOUND MOTION-PICTURE PROJECTOR
Filed Feb. 26, 1947     13 Sheets-Sheet 13
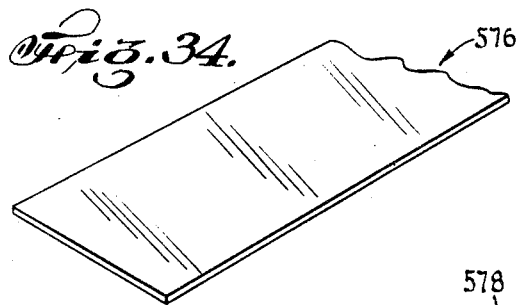
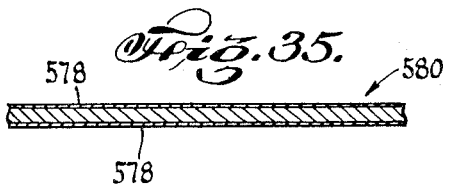
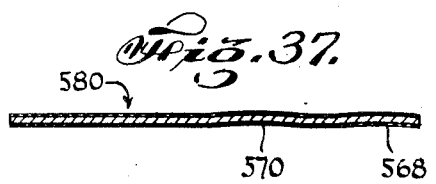
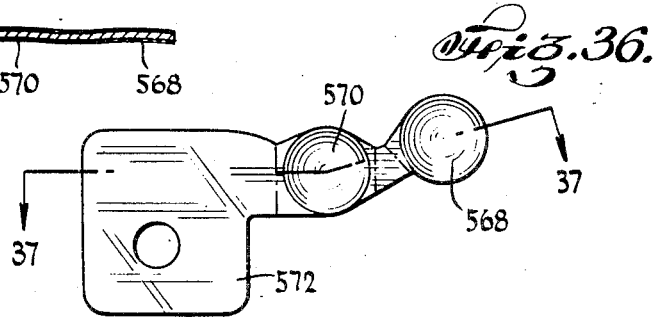
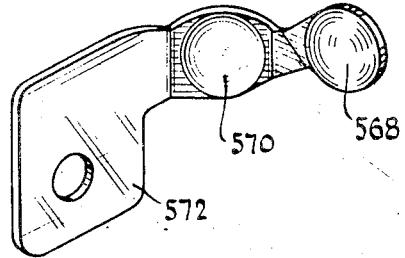
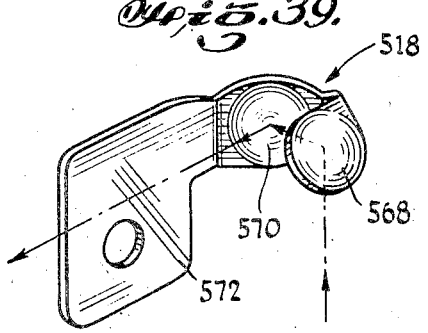
INVENTORS
OSMOND KENDALL
SMILEY W. LOACH
BY
ATTORNEY Patented Mar. 28, 1950

2,502,011

UNITED STATES PATENT OFFICE 2,502,011

SOUND MOTION-PICTURE PROJECTOR

Osmond Kendall, Ottawa, Ontario, and Smiley W. Loach, Toronto, Ontario, Canada, assignors to Raymond Allen, Toronto, Ontario, Canada Application February 26, 1947, Serial No. 730,920

14 Claims. (Cl. 88—16.2)

1

This invention relates to motion picture projectors.

The actual projector shown and described in the instant application is specially designed for use as a combined sound and motion picture projector, but it is to be understood that this embodiment of our invention is given by way of example only and is not to be interpreted as limitative except to the extent that features specific thereto are included in the appended claims.

It is a primary object of our invention to provide a combined sound and motion picture projector of sturdy, simplified and inexpensive construction.

It is another object of our invention to provide a combined sound and motion picture projector in which the film manipulating parts that must be handled by an operator, e. g. the film sprocket, the film gate, the sound drum, the idler, etc., are the only externally accessible parts, thereby reducing threading complications to a minimum.

It is another object of our invention to provide a combined sound and motion picture projector which is so constructed that it is extremely easy to disassemble when necessary to adjust or replace some part thereof.

It is another object of our invention to provide a combined sound and motion picture projector in which the components are consolidated in a few units, such for example as (1) a motor and lamp unit; (2) a power pack, amplifier, pick up and exciter supply unit, hereinafter referred to as an "amplifier" unit; and (3) a film handling unit, whereby any one of the units having a defective component can be removed and replaced as a whole.

It is another object of our invention to provide a combined sound and motion picture projector having a clear and undistorted sound delivery.

It is another object of our invention to provide a combined sound and motion picture projector having an amplifier with a relatively low number of components whereby to lower the manufacturing cost and compact the amplifier so that it may fit into the limited confines desired. In this connection it is a more limited object of our invention to provide a combined sound and motion picture projector having an amplifier in which tone control and compensated frequency response are incorporated without too great a reduction in gain so that fewer, smaller and lighter parts can be used.

It is another object of our invention to provide a combined sound and motion picture projector

2 in which the volume of the sound delivery is not too sharply reduced by marked drops in line voltage.

It is another object of our invention to provide a combined sound and motion picture projector which is lighter and more compact than like projectors presently on the market so that our projector truly is portable. In this respect it is an ancillary object of our invention to provide a projector of the character described in which all parts can be secured to one another for carrying as a single piece and, moreover, in which the parts when thus secured are so relatively arranged that the projector can be handled easily.

It is another object of our invention to provide a combined sound and motion picture projector wherein the various factory adjustments can be made rapidly and easily and yet which, when once made, will remain unaltered in the field without incorporating complicated locking devices.

It is another object of our invention to provide a motion picture projector having an improved, simple, inexpensive and rugged framing means, film gate, tilting means, objective lens holder, film take-in and pay-out, and film supply and take-up.

It is another object of our invention to provide a combined sound and motion picture projector in which an improved stabilizer is included to smooth out flutters in the sound drum caused by surges in the film take-in.

It is another object of our invention to provide a combined sound and motion picture projector having an improved mounting for the sound drum and flywheel assembly which is such that the sound drum will run absolutely true and without vibration or chatter, although said mounting is very simple and inexpensive.

It is another object of our invention to provide a combined sound and motion picture projector having an improved adjustable mounting for the sound optic which permits the same to be lined up rapidly and with ease.

It is another object of our invention to provide a combined sound and motion picture projector in which the sound-optical system is of such nature that the photoelectric cell can be located in any position which best lends itself to compactness of construction, economy of manufacture and efficiency of operation.

It is another object of our invention to provide a combined sound and motion picture projector in which the photo-electric cell is so disposed as to be remote from any moving parts or ungrounded conductors connected thereto, whereby to minimize stray noise.

It is another object of our invention to provide a combined sound and motion picture projector in which the shaft supporting the sound drum and flywheel is very short so that the projector can be further compacted. In general, this last named object of our invention is achieved by mounting the exciter lamp on the panel and having the photo-electric pick up cell mounted in back of the panel, but projecting therethrough, and, further, by directing the light from the exciter lamp through the sound track of the film on the sound drum and thence back to the photo-electric cell. In this connection it is a further object of our invention to provide a novel type of reflector for directing the light beam in the foregoing fashion and to provide a method for making said reflector in a manner such that the same shall be highly accurate in operation and yet economical to manufacture. Inasmuch as the arrangement mentioned locates all parts, save the reflector, transversely away from the shaft for the sound drum and flywheel, the length of said shaft can be kept short.

It is another object of our invention to provide a motion picture projector having an improved intermittent film advancing means which, although positive in action, has a free moving film claw.

It is another object of our invention to provide a motion picture projector in which the projection bulb is easily accessible for removal and replacement even when the projector is in its travelling case.

It is another object of our invention to provide a motion picture projector having a highly efficient and novel slip clutch in the kinematic train driving the film take-up reel, said clutch being such that it will operate smoothly at all speeds.

It is another object of our invention to provide a motion picture projector having means for preventing film from winding around a sprocket.

Other objects of our invention will in part be obvious and in part hereinafter be pointed out.

The invention accordingly consists in the features of construction, combinations of elements and arrangement of parts which will be exemplified in the construction hereinafter described and of which the scope of application will be indicated in the following claims.

In the accompanying drawings in which is shown one of the various possible embodiments of our invention, Fig. 1 is a front elevational view of a combined sound and motion picture projector constructed in accordance with out invention, the same being illustrated as it appears when the various parts are assembled into a single piece for transportation;

Figs. 2, 3, 4 and 5 are a right end elevational view, a left end elevational view, a plan view and a rear elevational view, respectively, of said projector;

Figs. 6 is a perspective view of the projector as it appears when set up for operation;

Fig. 8 is a top view of the portion of the projector shown in Fig. 7;

Fig. 9 is a rear view of the interior of the projector, the same being taken substantially along the line 9—9 of Fig. 8;

Fig. 10 is a top view of the interior of the projector, the same being taken substantially along the line 10—10 of Fig. 9;

Fig. 11 is a rear view of the front panel and components mounted thereon, the same being taken substantially along the line 11—11 of Fig. 10;

Fig. 12 is an enlarged fragmentary sectional view through the components carried on the face of the front panel, the same being taken substantially along the line 12—12 of Fig. 10;

Fig. 13 is a sectional view taken substantially along the line 13—13 of Fig. 7, the same being illustrative of the construction of the driving elements between the motor and the various film moving devices including the slip clutch in the kinematic train for the film take-up;

Figure 7:
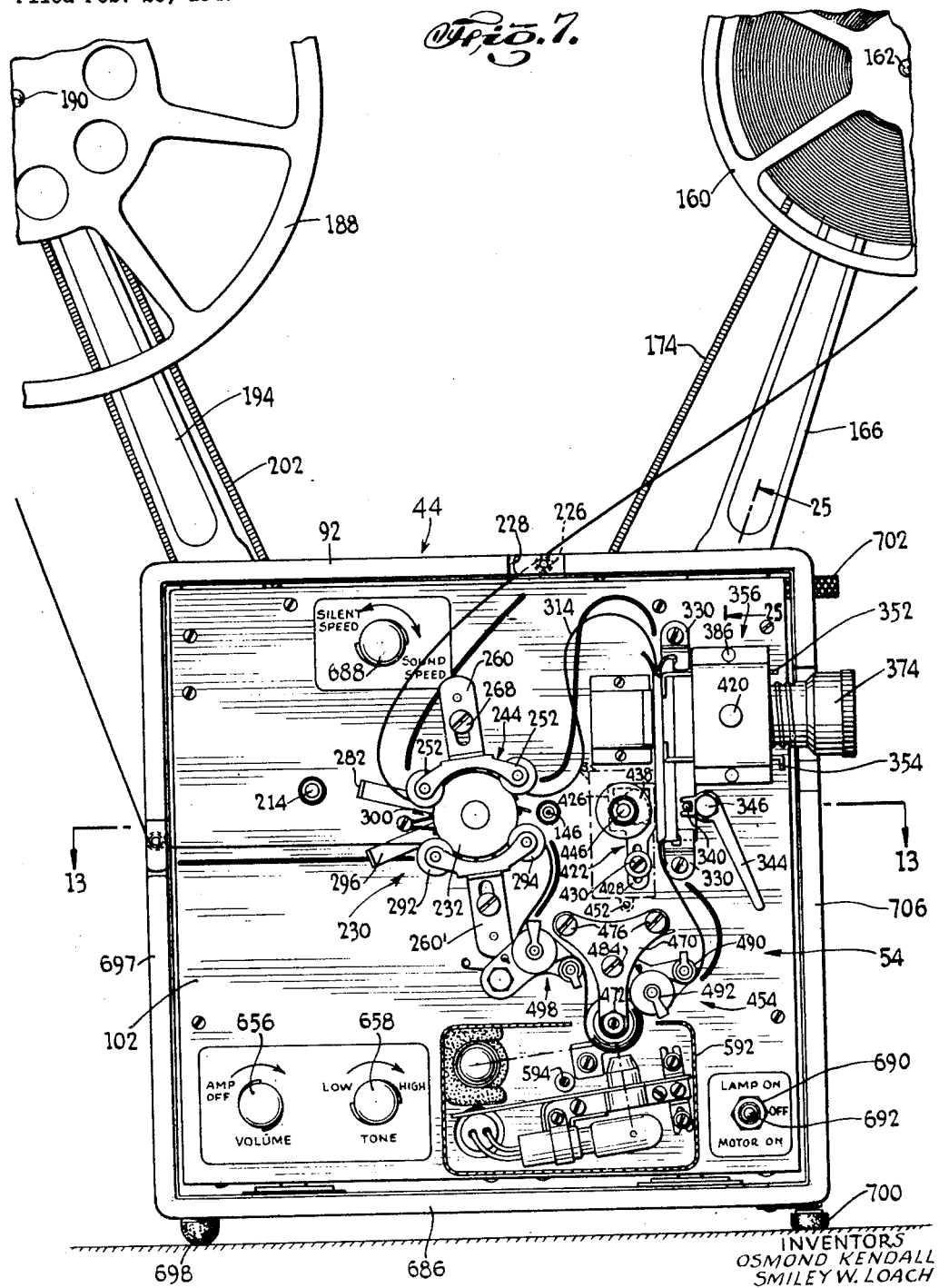
Fig. 7 is a front view of the projector panel and traveling case set up for operation.

Figs. 14 and 15 are sectional views through said clutch, the same being taken substantially along the lines 14—14 and 15—15, respectively, of Fig. 13;

Fig. 16 is a sectional view through the means for moving into and out of operative position the idlers which cooperate with the film take-in and pay-out sprocket, said view being taken substantially along the line 16—16 of Fig. 13;

Fig. 17 is a sectional view taken substantially along the line 17—17 of Fig. 9, the same being illustrative of the construction of the tilting mechanism;

Fig. 18 is a fragmentary sectional view taken substantially along the line 18—18 of Fig. 17;

Fig. 19 is a fragmentary sectional view taken substantially along the line 19—19 of Fig. 17, the same being illustrative of the resilient mountings of the chassis for the front panel and of the chassis for the two units carried thereby;

Figs. 20, 21 and 22 are enlarged fragmentary sectional views taken substantially along the lines 20—20, 21—21 and 22—22, respectively, of Fig. 19, the same being illustrative of details of the aforesaid resilient mountings;

Figs. 23 and 24 are enlarged fragmentary sectional views taken substantially along the lines 23—23 and 24—24, respectively, of Fig. 8, the same being illustrative of details of the film supply and film take-up sheaves;

Fig. 25 is an enlarged sectional view taken substantially along the line 25—25 of Fig. 7, the same being illustrative of a detail of the means for detachably mounting a reel arm;

Fig. 26 is a sectional view taken substantially along the line 26—26 of Fig. 12, the same being illustrative of the construction of the combined film take-in and pay-out sprocket and of the idlers and tensioner associated therewith;

Fig. 27 is a sectional view taken substantially along the line 27—27 of Fig. 12, the same being illustrative of the sound drum and flywheel assembly and of the double reflector for directing onto the photo-electric cell a beam of light which has been modulated by the film sound track;

Fig. 28 is a sectional view taken substantially along the line 28—28 of Fig. 12, the same being illustrative of the path of the light beam from the double reflector to the photo-electric cell;

Fig. 29 is a sectional view taken substantially along the line 29—29 of Fig. 12, the same being illustrative of the construction of the adjustable sound optic bracket;

Fig. 30 is a sectional view taken substantially along the line 30—30 of Fig. 12, the same being illustrative of the construction of the objective lens holder;

Fig. 31 is a sectional view taken substantially along the line 31—31 of Fig. 12 and shows other details of the objective lens holder;

Fig. 32 is a sectional view taken substantially along the line 32—32 of Fig. 31, the same being illustrative of the detachable mount for the objective lens holder;

Fig. 33 is a wiring diagram of the circuits for the amplifier unit;

Fig. 34 is a perspective view of a piece of blank stock from which the double reflector is made;

Fig. 35 is an enlarged sectional view through said stock;

Fig. 36 is a plan view of a double reflector blank cut from the stock shown in Fig. 34;

Fig. 37 is a longitudinal sectional view through the blank shown in Fig. 36, the same being taken substantially along the line 37—37 of Fig. 36;

Fig. 38 is a perspective view of the blank after the first bending operation has been performed thereon; and Fig. 39 is a perspective view of the completed double reflector.

Referring now in detail to the drawings, 40 denotes a combined sound and motion picture projector embodying our invention. For convenience, said projector is mounted in a carrying case 42 (Figs. 1–5) consisting of a plurality of sections each of which contains one or more projector components so mutually arranged that the carrying case is of a convenient size for easy handling and that the center of gravity thereof is approximately below the physical center of the top of the case.

The carrying case includes three sections, to wit, a picture projector section 44; a section 46 which acts as a cover for the picture projector section, and is adapted to conceal the film handling elements during portage; and a sound projector section 48 which is adapted to house a loud speaker and, optionally, an electric cord connecting the loud speaker to an amplifier in the picture projector section.

The film projector proper is carried by the section 44. Pursuant to a feature of our invention, said projector is built in three independent and separable units, these being a motor and lamp unit 50 (Figs. 9 and 10), an amplifier unit 52 comprising a power pack, an amplifier, a pickup, and an excited supply, and a third unit 54 (Figs. 6 and 7) which handles the film. For convenience, each of these units will be discussed separately.

The motor and lamp unit 50 (Figs. 9, 10, 13 and 19) comprises a sheet metal chassis 56 which is fixedly secured in a suitable manner, later described, to the film handling unit 54. Said chassis houses an electric motor 58 of any conventional type adapted to be used for projection work, the same being electrically connected to a fixed prong plug 60 which is adapted to be detachably connected in the usual manner to any electric outof proper frequency and/or type of current to energize the motor. The forward end of the motor carries a drive shaft 62 (Figs. 11 and 13) bearing a crowned pulley 64 which serves as the actuating element for all moving parts of the film handling unit 54. As will shortly be made clear, the motor pulley 64 is detachably connected to the driving train of said film handling unit.

The motor chassis 56 also supports a projection lamp 66 whose socket (not shown) is mounted on a spider 68 secured to the upper wall of the chassis and located over an opening therein. The lamp is surrounded by a protective housing 70 having a built-in reflector 72 and lens 74.

Removal of heat is facilitated by mounting a tubular corrugated shield 76 on the lamp with spring clips 78. In addition, a second tubular shield 80 may surround the corrugated shield 76, said second shield being spot-welded to the lamp housing. Both of the shields are provided with front and back apertures affording access to the reflector 72 and lens 74.

Only the inner shield 76 and lamp 66 extend above the top of the housing 70, the projecting portions thereof being removably covered by a cap 82 (Fig. 9) carrying a grille 84 (Fig. 8) consisting of a plurality of light guard sections 86 which permit the heated air to rise freely from the lamp and act as light blocking louvers. The cap 82 is formed with an aperture 86 in its side wall which receives a tab 88 (Figs. 9 and 10) extending horizontally from and rigidly secured, as by welding, to the portion of the inner corrugated shield 76 which projects above the housing 70. The location of the cap is determined by abutment of an interior projection thereon against the top of the housing 70. This arrangement is employed to assure proper positioning of the shield 76 and thus have the openings therein in correct alignment with the reflector 72 and lens 74.

The cap 82 projects through a hole 90 in the top wall 92 of the carrying case section 44. Said cap may be removed when the projector is carried about, as shown for example in Figs. 1, 2, 3 and 5, and can be placed in proper position when the projector is to be set into operation. At such times as it is not in use, the cap can be disposed in the loud speaker section 48 of the carrying case. The foregoing arrangement (projection of the lamp and corrugated shield above the housing 70) allows said shield and lamp to be removed easily when a lamp burns out. It will be noted that the removable corrugated shield centers itself on the lamp envelope.

The motor chassis 56 includes a plug socket 94 (Figs. 9 and 10) for detachably receiving a bayonet plug 96 which effects an electrical connection from the motor turning source of power to the amplifier unit 52.

The speed of the motor is changeable (e. g. from the speed for sound to that for silent projection) by a rheostat 98 connected to the motor chassis through a two-wire cord 100. For convenience in operating the projector, said rheostat is mounted in conventional fashion on the film handling unit 54.

It now will be appreciated that the motor and lamp unit 50 comprise an element of the projector which can be detached as a whole in the event that any one of the component parts thereof is defective so that said unit can be replaced by a good unit and the projector thus repaired rapidly. The only operations which must be performed in order to remove the motor and lamp unit are to detach the plug 96, to dismount the rheostat 98 and to undo a few screws, nuts and bolts, hereinafter described, which connect the motor chassis 56 to the film handling unit 54.

The film handling unit 54 includes a chassis 101 having a vertical front panel 102, a horizontal base panel 104, and a pair of side gusset plates 106. The front panel may be made of relatively thick metal stock, e. g. aluminum, inasmuch as it supports all the exposed film handling parts, while the remaining elements of the chassis 101 can be made of thinner stock. The horizontal base panel has an upturned flange 108 at its forward edge which is permanently secured in any suitable fashion, for example by welding, to the rear face of the front panel along the bottom edge thereof. The forward edges of the side gusset plates 106 are inturned to form flanges 110 which are rigidly secured, as by screws, to the back surface of the front panel along the side edges thereof. The bottoms of the gussets likewise are inturned to form flanges 112 which are rigidly secured to the undersurface of the base panel 104 adjacent its side edges.

Thus, the chassis for the film handling unit essentially comprises a front and a base panel rigidly and permanently secured to each other in perpendicular relationship. The base panel serves two functions later described in detail. These are (A) to detachably support the motor and lamp unit 50 and the amplifier unit 52, and (B) to be detachably connected to the section 54 of the carrying case. As now will be pointed out, the front panel serves to carry the various film handling units and the drive therefor.

Referring to Figs. 11 and 13, the motor pulley 64 engages a driving belt 114 which is trained around the crowned rim 116 of a light wheel 118. Slack in the belt is taken up by a swinging spring loaded tension pulley 120. It will be seen that such arrangement enables the motor pulley 64 to be readily disengaged from the belt 114. The light wheel 118 comprises a hub 122 which is connected to the rim 116 by a pair of quadrantal diametrically opposed sectors 124, thus leaving a pair of quadrantal diametrically opposed apertures 126. Said light wheel is so positioned that, when it turns, the apertures 126 alternately pass in front of the lens 74 whereby the beam of light issuing from said lens will be intermittently intercepted by the sectors 124.

In order to enable the intervals during which light passes through the light wheel to be properly synchronized with the motion of the film, the hub 122 of the light wheel is provided with a pair of tapped apertures which receive screws 128 whose shanks pass through arcuate concentric slots 130 in a disc 131 against which the heads of the screws bear. Said disc is fixed to a light wheel shaft 132 thereby permitting relative angular rotation between the apertures 126 and said shaft.

The shaft 132 is journaled at its front end in a bushing 133 set into the front panel 102 and at its rear end in a needle bearing 134 secured to a strap support 136 located in back of the front panel and having its two ends extending forwardly into engagement with and fastened to said front panel by screws. The light wheel shaft 132 has fixed thereon a pinion 142 (Figs. 10 and 13) which meshes with a gear 144 rotating on a shaft 146 supported on the front panel 102. The gear 144 turns with a pinion 150 engaging a gear 152 secured to a shaft 154 (Figs. 10, 13 and 26). This latter shaft is journaled between a bushing 156 on the front panel and a needle bearing 158 on the strap support 136.

The film take-up and supply reels and their supports and drives are best shown in Figs. 8, 10, 11, 23, 24 and 25. A film supply reel 160 is snap-fitted on a supply spindle 162 rotatably received in a bearing 164 formed on the upper end of a supply reel arm 166. The lower end of this arm is enlarged and specially shaped for a simple detachable connection to the front panel 102. Such connection consists of a step 168 formed on the front side of the reel arm. The riser of said step is a narrow, long flat surface which is adapted to be seated against the upper edge of the front panel and the tread of said step comprises a wide flat surface which is adapted to bear against the back of the front panel adjacent the upper edge thereof. This affords an excellent bearing for the reel arm. The reel arm is held in such position by a bracket 170 fastened to the back of the front panel and so shaped that it slidably engages the back and side surfaces of the lower end of the reel arm when the same is in operative position.

The spindle 162 extends through the bearing 164 and the rearwardly projecting end thereof carries a sheave 172 in whose groove there is adapted to be received a resilient belt 174, such as a conventional coiled wire spring. Said belt also is trained about a sheave 176 fixed to turn with the gear 144. The rearwardly projecting end of the spindle 162 has mounted thereon another sheave 178 which, unlike the sheave 172, is not fixed to said spindle but is mounted thereon with a ball bearing 180 so that the sheave 178 can turn freely with respect to the spindle.

The belt 174 is trained around the fixed sheave 172 at such time as film is to be rewound and is trained about the idling sheave 178 during projection. The belt 174, as is conventional, operates under tension so that it pulls the spindle 162 toward the front panel 102. This action is employed to hold the riser of the step 168 against said front panel, thus maintaining the film supply reel arm 166 in operative position.

When it is desired to dismount the reel arm, e. g. after a showing, the belt 174 is removed and the arm 166 simply lifted out from under the bracket 170. Said arm is stored in the cover section 46 of the carrying case when the projector is transported, being received in a pair of aligned grooves 182 (Fig. 6) formed in blocks 184 fixed inside said cover section. The reel arms are held in the grooves by straps 186 having one end riveted to the blocks on one side of the groove and the other end detachably connected, as by a snap, to the block on the other side of the groove.

A film take-up reel 188 is snapped onto a spindle 190 rotatably journaled in a bearing 192 integrally formed at the upper end of a take-up reel arm 194, the lower end of which is detachably secured to the front panel 102 in exactly the same fashion as the supply reel arm 166. Said spindle extends rearwardly from the take-up arm, the projecting portion thereof having a compound sheave 196 fixed thereto. This sheave includes two grooves 198, 200 adapted to have disposed therein a resilient belt 202 similar to the belt 174. One of the grooves, e. g. the groove 198, is somewhat larger than the diameter of the belt so that the belt when located therein can slide with respect to the sheave. The other groove 200 has the same diameter as that of the belt so that the sheave 196 will be turned by said belt when the belt is disposed therein. The belt 202 is trained about a sheave 204 (Fig. 13) comprising the driven part of a friction slip clutch 206 mounted on the front panel 102. The driving part of said clutch includes a sheave 208 which is engaged by a resilient belt 210 trained about a sheave 212 fixed for rotation with the shaft 154.

From the foregoing it will be seen that during projection the drive for the film supply and take-up reels is as follows:

From the motor pulley 64 through belt 114, light wheel 118, shaft 132, pinion 142, gear 144, pinion 150, gear 152, sheave 212, resilient belt 210, sheave 208, friction slip clutch 206, sheave 204, resilient belt 202, and groove 200 of the compound sheave 196 to spindle 190. While the take-up reel is being driven in this fashion, the resilient belt 174 is trained about the free turning sheave 178 so that film can be pulled freely from the supply reel 188.

During rewind, the supply reel is driven as follows: From motor pulley 64 through belt 114, light wheel 118, shaft 132, pinion 142, gear 144, sheave 176, resilient belt 174 and fixed sheave 172 to spindle 162. While rewinding is taking place, the resilient belt 202 is positioned in the groove 198 of the compound sheave where it is able to exert only a slight turning effort so as to apply a light drag to the film which will enable said film to be maintained under the desired mild degree of tension during rewinding.

According to a feature of our invention, the friction slip clutch 206 (Figs. 13, 14 and 15) is of improved construction such that with relatively few, simple and inexpensive parts it will operate smoothly to transmit only a desired amount of torque at all relative speeds, and particularly at low percentages of slip where slip clutches tend to grab. This minimizes irregularity and jerking of the film take-up which, normally, is augmented by the presence of a resilient belt in the drive for the take-up reel, such belt desirably being used for various reasons mentioned herein. It is pointed out that abnormal irregularity or jerking of the film take-up seldom is completely filtered out by film handling mechanisms and, therefore, would appear at the sound drum.

Said clutch has the driving sheave 208 thereof journaled, as for instance with needle bearings, on a shaft 214 fixed to the front panel 102. Said shaft extends rearwardly beyond the sheave 208 to rotatably support the driven sheave 204 which is in the form of a self-lubricating bronze member having an internal grease-filled bore or drum 216 concentrically disposed with respect to the shaft 214. A series of registered concentric expansion rings 218, are located within the bore 216, the same being fabricated from a material such as spring steel, which is considerably harder than the surface of the drum 216 which it engages. Said rings are so fashioned that normally they have a radius of curvature slightly larger than the bore, whereby, when compressed inside said bore, the rings tend to expand and thus will press against the walls of the bore. Each ring has one end thereof inturned to form a leg 220, and all the legs are caught between a pair of pins 222 mounted on the driving sheave 208 and extending rearwardly from said sheave into the bore 216 of the driven sheave 204.

In the operation of the clutch, the driving sheave 208 is turned in such direction (clockwise as seen in Figs. 14 and 15) that the pins 222 will pull the rings 218 around the shaft 214 with the legs 222 leading. This will turn the driven sheave 204 with the driving sheave, the critical amount of torque transmitted being determined by the static friction between the rings and the walls of the bore 216. When this frictional torque is exceeded the clutch will slip and, thereafter, will transmit a slightly lesser torque which remains substantially constant at all relative speeds of the driving and driven sheaves.

Optionally, the two sheaves may be separated by a fibre disc 224 to prevent a metal-on-metal rubbing engagement. Said disc is apertured to pass the shaft 214 and pins 222.

Attention is directed to the fact that the clutch 206 transmits a uniform torque over a long period of time as well as at all percentages of slip. This is due to the fact that the expansion rings wear grooves in the softer metal of the drum 216, thereby increasing the contact surface and compensating for the reduction in tension of the expansion rings as they wear. Such action is highly desirable, as it enables us to select an optimum transmitted torque for the machine when new. This is in contrast to ordinary friction slip clutches which transmit less torque as they age and which would be highly undesirable for satisfactory film take-up in a projector since it would require a dangerously large initial torque to leave an adequate torque after a long period of usage.

After leaving the supply reel 160 the film passes over an idler roller 226 (Figs. 8, 10 and 12) disposed in an entry notch 228 at the top wall 92 of the carrying case section 44. From this point the film moves onto a combined film take-in and pay-out mechanism 230 (Figs. 7, 12, 13, 16 and 26). This mechanism comprises a large (16 tooth) sprocket 232 fixed for rotation on the shaft 154. The sprocket includes a front flange 234 having teeth adapted to engage the film sprocket holes in the film and a rear flange 236 having a peripheral groove 238 over which the sound track on the film is adapted to ride so that the same will not be marked.

The film coming from the idler roller 226 is guided onto the sprocket 232 by a roller 240 having a front flange which is grooved to ride over the teeth of the sprocket and a rear flange which is grooved at the sound track. The film is kept in contact with the sprocket 232 over a sufficient angular distance by an idler roller 242 identical with the roller 240 but spaced approximately 110° therefrom, said rollers pressing the film against the sprocket at the points of contact with the rollers.

Both rollers 240, 242 must be rotatably mounted and so supported that they can be moved towards and away from the sprocket 232 to permit threading of film in the projector. To this end both rollers desirably are carried by a single element movable to and from the sprocket so that they can be moved together to simplify threading. Accordingly, we provide a sheet metal journal element 244 consisting of a flat body 246 having vertical front and rear flanges 248, 250. Both these flanges include sidewise extending arms 252 provided with apertures 254 in which stub journals 256 of the rollers 240, 242 are rotatably secured. The journal element 244 is rigidly mounted, as by welding, to the forwardly extending leg 258 of a sliding strip 260 which lies flat against the front of the vertical panel 102. Said strip is provided with a rearwardly extending pin 262 which is slidably received in a slot 264 formed in the vertical panel. In addittion, the strip has a slot 266 in which there is slidably received a cylindrical portion 268 of a stud 270 screwed into the front panel. The slots 264, 266 run along a line joining the shaft 154 and stud 268 so that the strip 260 is guided for reciprocal movement toward and away from the sprocket 232.

Means also is included to shift the strip toward and away from the sprocket. Said means comprises a rearwardly extending pin 272 (Fig. 26) carried by the flange 250 and slidable in a cam slot 274 (Fig. 16) cut in an operating element 276. This element consists of a flat piece of sheet metal having a circular aperture which is journaled on a sleeve 278 surrounding the bearing 156 and located between the sprocket 232 and front panel 102. Said element has a manipulating arm 280 with a forwardly projecting tab 282. The cam slot 274 consists of two portions. Of these, one is a long, operating portion which runs outwardly in a general direction toward the tab 282 and has a component extending radially away from the center of rotation of the sprocket 232. The other portion, which comprises the locking portion, may be shorter and extends in a direction approximately opposed to that of the first named portion. Said locking portion either may be concentric about the axis of rotation of the sprocket or, like the operating portion, may have a component extending radially away from the sprocket. Thus, the slot has a break point 283, the radial distance from which to the center of the shaft 154 does not exceed the radial distances to the center of said shaft of portions of the slot to both sides of the break point.

It will be seen that if the manipulating arm 280 is moved clockwise from the position it occupies in Fig. 16, the operating portion of the slot 274 will engage the pin 272 and move the journal element 244 and rollers 240, 242 away from the sprocket. If the arm is moved back, it will return said rollers to their film engaging position. When the pin 272 is in the locking portion of the slot 274, the rollers 240, 242 cannot be forced apart manually, inasmuch as any such pressure will only tend to make the rollers press more tightly against the film. Thus said rollers will remain in place and cannot become disengaged from the sprocket 232 either accidentally or because of vibration.

A spring 284 encircles the sleeve 278 and presses the bearing portion of the operating element 276 surrounding said sleeve against a flat retainer plate 286 fixed to the exposed surface of the front panel in any suitable manner, e. g. by rivets. Said retainer plate is formed with an indentation 288 which is adapted to receive a rearwardly extending nib 290 on the back surface of the operating element 276 when the same is in the closed position indicated in Fig. 16. The cooperation between the indentation and said nib aids in holding the operating element in locked position against inadvertent displacement and also provides a tactile signal to the user that the operating element is properly disposed for running the projector.

The two rollers 242, 244, acting in conjunction with the sprocket 232, comprise a pay-out-mechanism which positively feed the film toward the film gate and other mechanisms hereinafter described.

In accordance with a feature of our invention, the same sprocket acts as a take-in-mechanism, this being accomplished by employing a second pair of rollers 292, 294 on the underside of the sprocket 232, each roller being diametrically opposed to a roller 240, 242. The rollers 292 and 294 are mounted on a sliding strip 260' identical with the strip 260 and are controlled by a lower operating element 296 which is substantially a mirror image of the upper operating element 276. The element 296 has a rearwardly extending nib 298 which, when said element is in the locked position shown in Fig. 16, will be received in a depression on the front face of the operating element 276 at such time as said latter plate also is in locked position.

It will be observed that the spring 284 presses both operating elements rearwardly so as to keep them in an easily operated position and insure that the projection in each snaps into the depression underlying the same at such time as the plates have locked the rollers.

Due to its size (at least 16 teeth) and dual function the aforesaid sprocket increases the gear reduction, reduces the number of gears and lowers the speed of the last gear. All these combine to quiet the machine, compact the mechanism and reduce manufacturing costs.

Where a single sprocket serves in the manner above described as a combined film take-in and pay-out there is danger that a portion of film which previously has been sharply bent may carry around to the idler roller 234. Once this has occurred, the film will wrap around the sprocket 232 while the projector is still in operation, and apparently in good working order. Such action will damage a substantial portion of the film and may mutilate the journal elements 244. We have prevented this from occurring by employing a deflector member 300 (Figs. 7, 12 and 13) comprising a strip bent into a shape best seen in Fig. 12. This shape is such that the strip includes a bight 302 which snugly receives a screw 304 engaging the front panel 102. From the bight the strip extends in divergent reaches 305, 306 to opposite sides of the sprocket 232 being disposed, however, between the front and rear flanges 234, 236 of said sprocket.

The strip includes oppositely disposed inwardly concave portions 308, 310 which lightly rest upon the sprocket. The uppermost of these portions (the one nearest the film pay-out) has the tip 312 thereof extending outwardly to project beyond the front and rear flanges of the sprocket. Optionally, this tip may be exteriorly concavely curved as indicated. Said tip serves as the deflecting element of the member 300 and will prevent a kinked film portion from traveling around the sprocket to the take-in roller 294.

After the film leaves the pay-out part of the sprocket, it travels through a slack bend 314 (Fig. 12) and enters a film gate 316. The film gate includes a rear or framer shoe 318 (Figs. 12, 13, 30 and 31) and a front shoe 320. The rear shoe includes a conventional film track 322 with the standard framing opening 324 and film claw opening 325. Said track comprises a flange extending from a leg 323 of a Z-iron 326 having another leg 327 permanently and rigidly secured, as by welding, to a heavy backing strip 328 which slides against the exposed surface of the front panel. The backing strip, and thus the rear shoe, is held in place by a pair of resilient clips 330 each having a portion butted against the front panel and held there by a setting screw 332. Each clip includes an elevated portion 334 which resiliently bears against the leg 327 of the Z-iron at an upper or lower end thereof. Moreover, said elevated portion includes a notch 336 having a constricted mouth 338, the edges whereof engage opposite surfaces of the central leg 339 of the Z-iron.

It will be appreciated that this arrangement will permit the rear shoe to be set in desired position and yet permit vertical reciprocation thereof in any adjusted position for the purpose of framing. Such vertical reciprocation is accomplished by mounting a forwardly extending pin 340 (Figs. 12 and 13) on the leg 327 of the Z-iron. Said pin is received between a pair of arms 342 forming an integral part of a framing lever 344 rotatably mounted on a framing stud 346 secured to the front panel 102.

It will be understood that oscillation of the framing lever will move the rear shoe up and down, thus enabling the framing aperture 324 to be properly adjusted.

It may be mentioned that light issuing from the lens 74 passes through a lens 348 (Figs. 10, 11 and 30) and from here is directed onto a reflector 350 (Figs. 12 and 30) which throws the light onto the framing aperture.

The front shoe 320 is carried by an adjustable support which includes an upper strip 352 and parallel lower strip 354 (Figs. 7, 12, 30 and 31), each having one end thereof permanently and rigidly secured to the front gate. Said strips are slidably received in an objective lens holder 356 which roughly is in the shape of a hollow box whose construction hereinafter will be described in detail, it being sufficient for the present to understand that such box includes two end walls 358, 360. Each of these walls is formed with a pair of vertically spaced, elongated horizontal openings 362, the openings in the forward wall 360 being registered with the matching openings in the rear wall 358 and loosely slidably receiving the strips 352, 354. It thus will be seen that the front film shoe is guided for movement toward and away from the rear shoe.

The lower strip 354 has its forward end provided with a downwardly turned tab 364 to facilitate shifting of the front shoe. Said strip 354 also has a notch 366 (Fig. 30) cut in one of its edges. This notch is adapted to receive an edge of the opening 362 in the forward wall 360 at such time as the front shoe is moved to threading position. The strip is urged in a direction to interlock the notch and opening by a long tension spring 368 having one end thereof anchored on an upstanding prong 370 struck from the strip 354 and the other end anchored on the front wall 372 of the objective lens holder.

It will be seen that the spring, in addition to acting as a biasing means for rendering the locking handle 366 effective, also serves to provide a biasing influence which urges the front film shoe against the film with the proper degree of pressure. To locate the front shoe in threading position, the lower strip 354 merely is pulled out until a click is felt, this being caused by the spring 368 pulling the notch 366 against an edge of the elongated opening 362 in the wall 360. To restore the front film shoe to projecting position, the strip 354 is pushed towards the front panel 102. This disengages the notch and elongated opening and allows the spring 368 to force the front film shoe toward the film.

The lower strip 354 is attached to the front shoe about midway between its extreme upper and lower points of engagement with the rear shoe so as to permit use of the single biasing spring 368 while still obtaining uniform pressure on the film over the entire portion thereof in the film gate. The provision of a biasing spring which is long, enables considerable variation in placement of the objective lens holder and its elements, without altering noticeably the pressure required to pull out the front shoe. This arrangement reduces manufacturing costs for the film gate and lens holder assembly.

The projector has a conventional objective lens disposed in a tube 374 whose rear end is formed into a male thread. Said lends tube is axially shiftably supported in the objective lens holder 356 (Figs. 30, 31 and 32). The latter is made from sheet metal and is of box-like configuration consisting of the front wall 372, the two end walls 358, 360, a top wall 376, a bottom wall 378, and a back wall 380. Optionally, the lens holder can be made in two pieces as shown, one of the pieces comprising the top, front and bottom walls and the other comprising the back and two end walls. To hold the pieces together, the top and bottom walls 376, 378 include upwardly and downwardly extending flanges 382, 384, respectively, which are secured rigidly and permanently, as by rivets 386, to the back wall 380. A spacing strip 388 is interposed between each of the flanges and the underlying portion of the back wall, these spacing strips being slightly shorter than the flanges in order to form channels 390 the purpose whereof will be pointed out hereinafter.

Means is provided to secure the objective lens holder to the front panel 102 in such fashion that the same can be readily detached if desired. Said means comprises a pair of locking pins 392 rigidly fastened to the front panel and extending forwardly therefrom. Each of these pins has a flange 394 which is adapted to be snugly received in a matching opening 396 in the back wall 380, thus serving to position the objective lens holder in certain relationship on the front panel. Each pin also includes an enlarged head 398.

Inside of the objective lens holder we provide a locking plate 400 whose upper and lower edges 402 are captively slidable in the channels 390. Said locking plate includes portions 404 which bear flatly against the back wall of the lens holder and are adapted to slide over the same. These portions each have a keyhole aperture 406, the circular portion of which can be slipped over the enlarged head 398 of the locking pin and the elongated narrow portion of which is adapted to slidably receive the shank of the pin 392 beneath the enlarged head.

To remove the lens holder from the projector, the locking plate is slid to the right, as viewed in Fig. 32, until the circular part of each keyhole aperture is registered with the head of the associated locking pin. Thereupon the housing may be pulled forwardly off the panel. Reversal of this operation will secure the housing to the panel.

The locking plate has a raised central arcuate portion 407 which is adapted to support one side of the lens tube 374. The opposite side of the tube is supported by another arcuate plate 408 having an extension 410 which is permanently and rigidly secured, as by welding, to the top wall 376 of the objective lens holder.

The plate 408 and its integral extension are made from sheet metal and are somewhat resilient so that with the cantilever type of attachment shown said plate can be swung slightly toward and away from the lens tube. The arcuate plate 408 includes a nib 412 which extends toward the lens tube, this nib being of proper shape to match the contour of the valley between the male threads in the lens tube. Said arcuate plate 408 and its extension are so shaped that normally the nib 412 lightly engages the aforementioned male threads, thus enabling the lens tube to be axially adjusted either by turning the same or by axially pulling or pushing the lens tube. In the latter event, the plate 408 has sufficient resilience to allow the nib to rise and fall over successive apices of the thread.

The foregoing sheet metal construction of the objective lens housing is both lighter, stronger and more economical than cast housings such as have ordinarily been employed heretofore.

We contemplate locking the lens tube in any adjusted position and for this purpose provide a clamping screw 414 which is threaded into a tapped aperture 416 in the front wall 372 of the objective lens holder. Said screw has an enlarged conical foot 418 which is adapted to press against the arcuate plate 408 in the vicinity of the nib 412. The screw employs a knurled head 420 for manipulation. When the screw is turned to press the foot firmly against the arcuate plate, the friction developed between the nib and lens tube will be so great as to prevent any rotary or axial movement of said tube.

The film is intermittently advanced through the film gate by a flat film claw 422 (Figs. 7 and 31) which includes film engaging teeth 424, a cam following box frame 426 (see also Fig. 13), and a slotted extension 428 (see also Fig. 27). A headed stud 430 is slidably received in the slotted extension, said stud being screwed into a cylindrical block 432 (see also Fig. 12) fastened to the front panel 102. To prevent chattering of the film claw, washers 434 are disposed on opposite sides of the slotted extension, said washers being lightly pressed against the extension by compression springs 436. The film claw is actuated by a conventional four-motion cam 438 fixed for rotation on a portion of the shaft 132 which extends through the front panel 102, a sleeve 440 being interposed between the claw and panel in order to locate the claw in proper position for engaging the sprocket holes in the film. Said cam and claws ride between a pair of composition, noise-reducing washers 442 freely rotatable on the shaft, the inside washer being caught between the cam and sleeve 440 and the outside washer being held in position between said cam and a nut 444 engaging a threaded portion 446 on the forward tip of the shaft 132. Said tip has a knurled operating handle 448 screwed on it.

The cam is slightly thicker than the hollow frame 426 of the film claw, such difference in thickness being in the order of 0.005 inch. This relative dimensioning of the parts, taken together with the arrangement and type of parts employed, constrains the tooth carrying portion of the film claw from chattering or vibrating and at the same time allows the claw to move freely under the actuation of the cam without wearing extensively against the washers 442. Moreover, since these washers are mounted on the shaft 132, they can rotate with the cam and, therefore, will not wear too rapidly.

The operating handle 448 is rotated by hand when it is desired to turn over the shaft 132 slowly, as, for example, after film has been threaded through the machine, but before power has been turned on so that it can be determined whether the teeth of the film claw properly are engaging the sprocket holes in the film.

The film claw and its associated parts are removably housed in a cover 450 held to the front panel 102 by screws 452 and through which the tip of the shaft 132 projects to receive the operating handle 448. The interior of the cover may be flock-lined to quiet the machine.

The film, after leaving the film gate and before being taken in by the lower portion of the sprocket 232, passes through the sound pick-up 454. Said pick-up includes a sound drum and flywheel assembly, a tensioner assembly, a flutter eliminating assembly, and a sound-optical system.

The sound drum and flywheel assembly (Figs. 7, 12 and 27) comprises a hollow sound drum 456 rigidly and permanently mounted on a shaft 458 which also supports a flywheel 460.

Preferably the flywheel is so constructed as to occupy a minimum of space without jeopardizing its stabilizing effect upon the sound pick-up. This may be accomplished by forming the flywheel from sheet metal as illustrated. Said flywheel is made in two sections, to wit, a cover 460a and a weight-carrying section 460b. The latter has a peripheral channel 460c in which lead 460d is cast. The flywheel is made by placing the section 460b on a horizontal surface with open side of the channel up and pouring molten lead therein. Subsequently the cover is applied. This method allows the hollow annular chamber to be uniformly filled with lead to provide the necessary heavy periphery needed to obtain the requisite stabilizing effect in a small compass.

The sound drum is disposed in front of the front panel 102 and the flywheel is located in back of said panel so that the shaft 458 necessarily passes through the panel. However, we prefer not to journal the shaft in the panel or in a part supported by the panel at the point where the shaft pierces said panel, inasmuch as such type of mounting will allow vibration of the sound drum induced either by its own slight unbalance, which can never be perfectly corrected, or by a slight unbalance of the flywheel, which also can never be perfectly true.

Accordingly, pursuant to our invention, we support the shaft 458 at its ends, and, moreover, so mount the ends of the shaft as to permit the bearings therefor easily to be aligned, thus avoiding the difficult assembly operation of exactly aligning the bearings which otherwise would be necessary to obtain a true running of this shaft.

As shown in the drawings, the two ends of the shafts are mounted on self-aligning bearings which in this instance comprise a hardened steel precision ball 462 at each end of the shaft running in a hardened steel angular contact bearing. Each of said bearings comprises a conical depression 464 formed on an end of the shaft and a conical depression 466 formed at an end of a hardened steel plug 468. The plug at the front end of the shaft is threadedly supported in a plate 470 and fixed in position by a lock nut 472. The plug at the rear end of the shaft is threaded in a bracket 474 carried by the front panel 102. The two plugs are adjusted to take up substantially all end play without imposing any end thrust. This arrangement provides point suspension which affords a very low bearing friction and greatly lessens the probability of dirt or grit working between the shaft and bearing at the single point of rolling contact. The plate 470, which carries the front plug 468, is itself supported from the front panel 102 by two long shanked screws 476, the plate being held away from the front panel by spacing sleeves 478. Such construction affords a cantilever outrigger bearing for the forward end of the shaft 458.

The tensioner assembly (Figs. 7, 12 and 27) includes an L-shaped plate 480 having a hub 482 rotatably supported on a screw 484 carried by the front plate 102. For convenience, the head of the screw extends through the outrigger plate 470. Said plate 480 is biased in a clockwise direction (as viewed from Fig. 12) by a torsion spring 486, and rotatably supports a pressure roller 488 and an idler roller 490, the forward end of each said roller being journaled in an outrigger bearing 492 supported from the plate 480 by a strap 494.

When the projector is idle, the roller 488 is pressed against the sound drum by the torsion spring 486. In operation, this roller acts to increase the area of contact between the film and sound drum on the entrance side of said drum and also to prevent relative movement at the sound drum and film.

The tension of the film as it rides onto the sound drum and the pressure exerted on the film and the sound drum by the roller 488 may be made more uniform by surfacing the roller 488 at least in part with an elastomeric material. We prefer to employ a synthetic elastomeric which will not retain abrasive particles, vinyl resins, e. g. polyvinyl chloride, being an example. Where this material is applied in the form of rings 496, as illustrated herein, the roller may be slightly recessed for reception of the rings in order to prevent them from drifting.

It is well known that it is of the utmost importance for the film to move past the sound drum at a very uniform rate of speed, the flywheel being used to dampen any flutter which may be present. However, even better results will be secured where, in addition to the flywheel, means is interposed between the sound drum and take-in side of the sprocket 262, in order to eliminate to as great an extent as possible the effect of any irregularity in the turning of said sprocket or surges in the take-up. Such means comprises a flutter eliminator 498 (Figs. 7, 12 and 26) in the form of an L-shaped plate 500 whose hub 502 is rotatably secured to the front plate 102 by a stud 504. Said plate rotatably supports a pair of rollers 506, 508 with outrigger bearings similar to the bearings 492. The plate 500 is angularly biased in a counter-clockwise direction by a torsion spring 510.

Unlike the plate 480, the plate 500 is relatively remote from the sound drum, being located approximately midway between said sound drum and the sprocket 232. Moreover, when the projector is idle the spring 510 moves the plate 500 to a position counter-clockwisely displaced from that shown in Fig. 12 so that at such time the center lines of the two rollers 506, 508 are substantially out of line with the line joining the centers of the roller 294 and the sound drum shaft 458.

In the use of the projector, film is threaded from the sound drum to the roller 294 and over the rollers 506, 508, the film crossing between a line joining the centers of said rollers. The threaded film is lightly tensioned, causing the plate 500 to move in a clockwise direction inasmuch as tensioning the film will tend to reduce the amount of film between the sound drum and roller 294, and such reduction in length of the film only can be achieved by shifting the rollers so as to bring the line joining their centers closer to parallelism with the line joining the centers of the shaft 458 and roller 292.

As the machine starts to project, the plate 500 will flutter for an instant and then, so quickly as not to be noticeable, reach a running position in which the tension of the film is balanced against deflection of the torsion spring 510. If now the speed of the sprocket 232 should momentarily increase, this increase will not immediately be transmitted to the sound drum so as to increase the speed thereof, but first will result in additionally stressing the spring 510 causing the plate 500 to move clockwise so that initially all the momentary increase in speed accomplishes is shortening of the length of the film between the shaft 458 and roller 294. Conversely a momentary slowing of the sprocket 232 results in a momentary increase of the length of the film between said shaft and roller. Thus temporary conditions which result in temporary fluctuations of the speed of film take-in will not affect the speed at which the sound drum is turned.

Attention is directed to the fact that both the tension assembly and the flutter eliminating assembly bend the film rather sharply and press against the same, whereby to prevent passage through the film to the sound drum of longitudinal surges imposed upon the film by any cause whatsoever.

The sound optical system (Figs. 7, 12, 27, 28 and 29) includes an exciter lamp 512, an optic 514, an exciter lamp-optic mounting bracket 516, a double reflector 518, a photo-electric cell 520, and a photo-electric cell mount 522.

The exciter lamp 512 is entirely conventional and is detachably mounted in a lamp socket 524 carried by the bracket 516. Said lamp is energized through a pair of wires 526 which are connected to a bayonet plug 528 which is received in a plug socket (not shown) supported on the front wall of the chassis for the amplifier unit 52. Said plug extends through an aperture 530 in the front panel.

The optic 514 also is of conventional construction and comprises a tube in which are optical elements of the proper type to concentrate light emitted from the exciter lamp into the form of a thin, narrow, converging beam.

The bracket 516 includes a heavy L-shaped plate 532 to one leg of which there is welded a split circular strap 534 whose ends have outwardly extending ears 536. These ears are apertured to receive a screw 538 having a nut 540 threaded thereon. The strap has the lamp socket 524 disposed therein and, after the exciter lamp is properly positioned with its filament centralized in back of the optic, the nut 540 is tightened to hold the lamp in position.

The other leg of the plate 532 has an upturned arm 542 to which there is permanently and rigidly secured, as by welding, another split circular strap 544, this one being adapted to receive the optic 514. Said strap likewise has a pair of outturned ears 546, the outer of which is somewhat longer than the underneath ear. Both ears are apertured in registration to receive a screw 548 which freely passes through the outer ear and is threadedly received in the tapped aperture of the underneath ear, thus permitting the ends of the ears to be tightened when it is desired to clamp the optic in the strap. The outer ear has a second aperture which is tapped to receive a screw 552. The lower end of the screw is freely received in an aperture 554 in the raised central portion 556 of a stirrup 558 having slotted ends 560 held to the front panel 102 by bolts 562. These slotted ends are aligned and snugly receive said bolts so that the stirrup can be shifted longitudinally of the slots for a purpose which soon will be described.

The lower end of the screw 552 has a pair of nuts 564 threaded thereon one immediately above and the other immediately below the central portion of the stirrup. Preferably, each of these nuts has a lock nut mounted alongside the same, so that the position of the nuts when once set will not be altered. Said nuts prevent the screw 552 from shifting axially relative to the stirrup but allow rotation thereof.

The plate 532 is rotatably mounted on the panel 102 by means of a nut and bolt 566.

The foregoing arrangement allows the optic to be adjusted in three ways. Turning the screw 552 swings the optic toward or away from the front panel 102, movement taking place in the upturned arm 542 which, since it is made of sheet metal, is resilient and, therefore, can be flexed. Such motion of the optic will move the beam of light transversely of the sound track, and thus enable the same to be centered with respect to the sound track. If the screws 562 are loosened, the optic can be swung about the pivot nut 566. This will enable the converging beam to be focused on the emulsion at the sound track. Loosening the screw 546 permits the optic to be turned. This azimuth correction enables the beam to be disposed at right angles to the direction of travel of the sound track.

The beam emitted from the optic passes through the sound track and is modulated thereby. Said beam must now be directed onto the photo-electric cell. If, as is conventional, the cell is disposed in back of the sound drum, the distance between the sound drum and flywheel will be materially increased and lead to increased manufacturing costs and a larger projector size. Pursuant to a feature of our invention, we have so located the photo-electric cell that the flywheel may be disposed close to the sound drum so that said cell can be mounted on the amplifier unit 52 where it can be isolated to the best possible extent from vibration. As will be observed from Figs. 7 and 12, the photo-electric cell is spaced transversely away from the sound drum shaft 458 and, as a matter of fact, is carried by the amplifier unit 52, said cell thus being mounted in back of the panel 102, but extending through said panel (Fig. 28) so that the actuating element thereof is located forward of the panel at a point remote from all sources which might engender noise. To enable the light modulated by the sound drum to be reflected back to a photo-electric cell situated in the foregoing position, a series of reflectors are placed beneath the sound drum. At least two reflectors are employed; one to direct toward the front panel the modulated beam which, previous to reflection, was traveling parallel to said panel, and the other to direct the once reflected beam outwardly away from the shaft 458. The first reflector comprises a concave sheet metal mirror 568 (Figs. 12, 27 and 28) which directs toward the back of the machine light modulated by the sound track and traveling in a direction parallel to the front panel. The light leaving the reflector 568 strikes the second reflector likewise fabricated from sheet metal and comprising a concave mirror 570. The second reflector is so oriented with respect to the first reflector 568 that it will direct the reflected beam outwardly away from the sound drum shaft 458 approximately parallel to the front panel and onto the actuating element of the photo-electric cell.

Although these two reflectors may comprise separate elements which are separately mounted on the front panel, we prefer to incorporate both reflectors into a single mechanical structure—preferably consisting of but one piece of metal which is mounted as a unit on the reflector. Accordingly, said reflectors comprise different portions of a sheet metal element having the shank 572 thereof secured to the front panel by a screw 574. This arrangement permits both mirrors to vibrate together and reduces unwanted modulation which can be caused by cross vibration if the mirrors are independently mounted.

It should be observed that the use of concave mirrors results in a lesser deflection and lesser dispersion of the modulated light beam for slightly erroneous placement of the mirrors and vibration thereof than would occur were flat mirrors employed, thereby simplifying factory assembly of the optical system. This desirable result is achieved because the concave mirrors behave substantially as combination reflectors and condensing lenses. The radii and positions of said mirrors are so selected that the mirror 570 receives its light from in front of the focusing point of the mirror 568 and focuses it at or near the target of the photo-electric cell. Such arrangement makes it possible to direct the greater part of the light onto the photo-electric cell despite manufacturing tolerances in the mirror mounting.

In accordance with an ancillary feature of our invention, the reflectors are made at a relatively low cost in the following manner:

A piece 576 (Figs. 34 and 35) of flat sheet stock of some easily electro-platable metal, e. g. brass, is electro-plated with a reflective metal 578, e. g. chromium, to impart a specular finish of high lustre, excellent reflectivity and non-tarnishability. As is well known in the art of chrome plating metallic bodies, an underplate of any suitable metal, for example nickel, may be applied before the application of the top chrome plate and, necessarily, said chrome plate must be burnished to obtain the desired mirror-like finish. It is pointed out that this plating 578 is exaggeratedly illustrated in order that its presence may be seen.

Next, a blank 580 is cut from the flat stock in the shape illustrated in Fig. 36. This blank includes the body 574 and the two reflectors 568, 570. However, it will be seen that both said reflectors still are in the same plane as the body. Optionally, the blanking operation may be performed before the chrome plating operation. However, we prefer to carry out the steps in the order first mentioned inasmuch as it is simpler and less expensive to burnish the entire surface of a large sheet of stock rather than the surfaces of several small pieces of flat stock.

At the time the blanking is effected or in a succeeding operation, the two reflectors may have the required concave surface imparted thereto, this being accomplished by a die forming operation, as is well known in the working of sheet metal.

We have found that chrome plating is sufficiently ductile to follow the new outline of the sheet metal base so that the resulting concave surface will be accurately compressed to the exact required contour without the necessity of performing an expensive burnishing operation upon a curved plated surface.

Now the blank is bent both at the portion thereof joining the reflector 570 to the body 572 and at the portion joining the two reflectors, the results of these successive operations being illustrated in Figs. 37 and 38.

The photo-electric cell 520 is of any standard type and is plugged into a socket 581 supported by the amplifier unit 52. Said cell is extremely sensitive and if it picks up any light modulated by the shutter sectors 124 or by an alternating current, the frequency of modulations will be heard in the emitted sound. To prevent this and to stop any stray light beam from another source from impinging upon the tube, said tube is extensively light-shielded. To this end the portion of the tube in back of the panel is surrounded by a static collecting metal sleeve 582 (Fig. 28)

which is attached to the amplifier chassis. This sleeve extends through an opening 584 in the front panel 102 through which the photo-electric cell also projects. The sleeve additionally functions to prevent any light which issues from a source within the carrying case from reaching the photo-electric cell. The sleeve is spaced from the aperture 584 to avoid contact between these two elements and such space is filled with a resilient material, e. g. rubber, in the form of a grommet 586 which is snapped into the opening 584 and presses lightly against the sleeve 582. The portion of the grommet on the outer face of the front panel and between the photo-electric cell and reflector 570 has a slot 588 (Fig. 12) cut therein to allow unimpeded passage of the light beam from the reflector to the photo-electric cell.

Light is blocked off between the exciter lamp and photo-electric cell by a fiber light guard 590.

All the elements of the sound equipment, save the sound drum, which is exposed on the face of the front panel 102, are covered by a protective box 592 held in place by a hand screw 594.

The photo-electric cell is in a conventional forward D. C. circuit adapted to modulate an electric current in accordance with the fluctuations in the light beam and is provided with a typical resistance preamplifying stage to secure a more suitable output impedance. Said circuit is schematically indicated by the block 596 in the wiring diagram of Fig. 33. The modulated output of the preamplifier is fed into a standard volume control circuit 598 and the adjusted level of modulations therefrom are led into a frequency correcting return branch 600 of an inverse feedback loop which is a feature of our invention and includes the output transformer 602 and the amplifier stages 604 (hereinafter described in detail). The return branch 600 also comprises a film loss compensating high frequency trap in the form of an R. C. combination 606 and a tone control network 608.

More specifically, the return branch 600 is fed by a wire 610 from a correctly phased voice coil winding 612 of the output transformer 602. This wire leads to a feedback resistor 614 whose value determines the amount of feedback. Said resistor is connected by a wire 616 to the film loss compensating high frequency trap 606 which includes a series connected resistor 618 and capacitor 620 running to ground. The capacitance of the latter is so selected as to bleed to ground the higher frequency components that otherwise would be fed back by the resistor 614, the resistor 618 serving to limit the extent to which said higher frequency components are reduced in the feedback branch. The trap 606 is employed to compensate for the weakening of the higher frequency components caused by the finite thickness of the scanning beam, an inherent drawback of all sound-optical systems.

From the high frequency trap, the feedback wire 616 continues on to the tone control network 608 which includes a tone control potentiometer 622 having an impedance which is high compared to the feed back resistor 614. Said potentiometer connects the wire 616 to ground. The potentiometer slider 623 is connected through a loading resistor 624 and a resistor 626 to a wire 628 which runs to the grid 630 of the first amplifier tube 632. A low frequency controlling capacitor 634 connects the wire 616 to the juncture of the resistors 624, 626. When the slider 623 is at the ground end of the potentiometer, the high impedance offered by the capacitor 634 to low frequencies becomes effective because the loading resistor is connected to ground. When said resistor is connected to the opposite side of the potentiometer, the impedance offered to feedback by the tone control network becomes substantially constant for all frequencies. This arrangement allows the low frequencies to be suppressed to any desired extent in the feedback.

The resistor 626 serves to isolate the tone and volume control networks.

By way of example, the following values have been found satisfactory for the divers resistors and capacitors in the feed back return branch; 50,000 ohms for the resistor 614, 4000 ohms for the resistor 618, 500,000 ohms for the potentiometer 622, 100,000 ohms for the resistor 624, 250,000 ohms for the resistor 626, 0.02 mfd. for the capacitor 620 and 0.001 mfd. for the capacitor 634.

The foregoing arrangement accomplishes the several functions of inverse feedback, film loss compensation, and adjustable tone control in a single return loop whereby, in accordance with a feature of our invention, to merge the losses of all the functions and lower the loss in gain which would be present if these functions were in separate return loops extending between the same or different points.

The modulations coming from the volume control circuit 598 are fed to the amplifier stages 604 including a first amplifier stage 635 whose output is direct coupled to a phase inverter stage 636. From here the modulations feed an R. C. coupled push pull amplifier stage 637 which energizes the output transformer 602, the latter being connected to a loudspeaker plug 638. The stages 635, 636 and 637 and their couplings are conventional.

A power pack circuit 640 is used to supply optimal filtered and decoupled voltages to the various stages. It will be observed that a voltage dividing circuit 642 is used to positively electrically bias all heater-to-cathode relations thereby better controlling alternating current disturbances.

As is conventional in sound projectors, the exciter lamp 512 is supplied with a current of frequency high enough to avoid a ripple in the emitted light beam. The circuit for this is indicated by the box 644. Said circuit includes a conventional plate inductance coupled oscillator stage. The regulation of said stage is accomplished partially in standard fashion by a grid resistor 646 and capacitor 648. Such circuits, however, at low line voltages sometimes incurred do not supply sufficient energy to the exciter lamp to produce a satisfactory sound output without the danger of unduly overrunning the exciter lamp at normal line voltages. Pursuant to a feature of our invention we minimize this effect by incorporating a resistor 650 to connect the plate and grid of the oscillator tube 652, said resistor 650 being of higher impedance than the grid resistor 646. The presence of said resistor 650 lowers the effective resistance of the resistor 646 because it connects the grid to the higher voltage of the plate, resulting in an increased exciter lamp voltage under conditions of lowered power supply voltage. However, under conditions of higher power supply voltage, the exciter lamp voltage will not be raised to a dangerously high level because the resistor 650 acts to inversely feedback the plate oscillations thereby tending to prevent the overrunning of the exciter lamp voltage.

The various electric components of the amplifier unit are supported on a sheet metal chassis 654 which, as already indicated, also supports the socket for the photoelectric cell. The manually manipulatable means for the amplifier unit include a knob 656 for the combined volume control and power switch and a knob 658 for the tone control potentiometer, these knobs being mounted on shafts 660, 662, respectively (Fig. 11) extending through the front panel 102.

As indicated earlier, the source of current for the amplifier unit is derived from the plug 96 through a two wire cord 664.

Both the chassis 56 of the motor and lamp unit and the chassis 654 of the amplifier unit, are detachably secured, e. g. with screws, to the chassis 101 of the film handling unit 54. Details of these attachments are shown in Figs. 19, 21 and 22.

The side walls of the chassis 56, 654 include inturned flanges 666 at their bottom edges. Said flanges have tapped apertures 668 provided at the corners of the chassis, the same threadedly receiving screws 670 whose heads press against rubber grommets 672 fitted into holes 674 in the horizontal base panel 104 of the film handling chassis. With this arrangement the amplifier motor and lamp units are provided with an antivibration mounting such as can be quickly detached from the film handling unit.

In addition, the film handling unit is detachably mounted on the carrying case section 44. This mounting is best seen in Figs. 19 and 20. The same comprises a long screw 676 which is threaded into a steel reinforcing bar 678 welded on the undersurface of the base panel 104. Said screw is received in the reinforced hub 680 of a Lord grommet 682 the metal plate 684 whereof is rigidly secured, as with wood screws, to the base wall 686 of the carrying case section 44. The aforesaid mounting, in addition to being quickly detachable, is vibration-proof.

It will now be appreciated that the entire projector can be quickly taken out of its carrying case and the various units thereof disassembled in order to make rapid replacements so that a new unit can be quickly inserted to render the projector operable should a component thereof break.

Assuming the projector to be ready to operate, as shown in Fig. 6, the same is taken apart as follows:

The resilient belts 174, 202 are disengaged from the sheaves at the ends of the reel arms 166, 194, and the reel arms removed from the brackets 170. Now the four screws 676 holding the chassis 101 to the carrying case section 44 are unscrewed, thus enabling the entire projector to be slipped out of said section. If it is desired to remove the motor and lamp unit 50, the set screw holding the knob 688 to the rheostat 98 is loosened and the lock nut 690 of the motor and lamp control switch 692 is taken off. Also, the four screws 670 holding the chassis 56 to the base wall 104 are undone. In addition, a screw 694 holding a grounding wire 696 in place is taken out. Finally, the plug 96 is pulled out of the socket 94. Said unit 50 can now be taken out and a new unit inserted in its place.

To remove the unit 52, the set screws holding the knobs 656, 658 in place are loosened, the screws 670 securing said unit to the base wall are taken out, and the plugs 96 and 528 are pulled. The unit 52 now simply can be lifted off the chassis 101.

The back end 697 of the carrying case section 44, i. e. the end opposite to that through which the objective lens tube 374 extends, has fixed feet 698 on the bottom wall 686. However, the forward edge has feet 700 which are vertically shiftable relative to the carrying case in order to tilt the projector to any angle desired for operation.

The means employed to move the feet 700 with respect to the section 46 is simple and positive in construction and operation, and economical to make. Said means includes a knurled operating knob 702 (Figs. 7, 8, 9, 17 and 18) having a portion thereof projecting through a slot 704 in the side wall 706 of the carrying case section 44. This knob is secured to a threaded shaft 708 which is journaled in a bearing 710 permitting rotation but not axial shifting thereof.

The shaft 708 meshes with a female thread formed inside of a boss 712 integral with a yoke fitting 714 whose shank 716 is restrained for vertical movement in a way 718. Said shaft carries a collar 720 which limits downward movement of the boss 712. Each arm 722 of the yoke has a vertical spindle 724 permanently and rigidly secured thereto, as by riveting. These spindles operate in grooves 726 cut on the inner surface of the side wall 706 and are constrained for vertical movement by slidable reception in apertures of metal plates 728 fixed to the base wall 686 of the carrying case section 44.

It will be obvious that turning the knob 702 will vary the relative vertical relationship between the feet 700 and the bottom wall 686.

When the machine is to be carried, the cover section 46 is swung about its take-apart hinged connection 730 to closed position in which it conceals the film handling elements of the projector. The cover is held in such position by a hook 732 rotatably mounted on the cover and adapted to be swung so as to engage a bail 734 on the section 44.

The combined motion picture and sound projector 40 also includes a conventional loud speaker 736 which is contained within the carrying case section 48. This latter section has a width and height exactly matching the width and height of the combined sections 44 and 46 so that the section 48 can be fitted smoothly onto that side of the combined sections 44, 46 from which the objective lens tube projects, whereby to form a neat and compact unit for easy handling. The section 48 is detachably secured to the sections 44, 46 by any suitable means, such for example as a plurality of toggle snap bails 740 adapted to engage mating lugs 742. A folding handle 744 on the section 44 is disposed directly above the center of gravity of the assembled parts. The face of the section 48 through which sound issues has an aperture 746 which is open when the projector is in operation and which, when the projector is to be carried, is covered by a board 748 removably held in position by a toggle snap bail 750 and lug 752 on one side, and on the other side by a plate 754 which can be inserted between the section and the speaker protecting screen.

When the projector is arranged for carrying, the loudspeaker is not connected electrically to the voice coil of the transformer 602, the loudspeaker supply wire 756 being wrapped about the back of the speaker cone where it is out of the way. At such time as the apparatus is to be employed, the free end of the supply wire is plugged into the loudspeaker outlet socket 638 disposed at the back of the amplifier unit 52 and accessible through an aperture 758 in the rear wall 760 of the carrying case section 44. Optionally, the amplifier unit 52 can be employed as part of a public address system and for this purpose its chassis 654 is provided with a suitable plug socket 762 which is adapted to receive a microphone pick-up plug. Said socket normally is covered by a cap 764 chained to the chassis 654.

It will thus be seen that we have provided a combined sound and motion picture projector which achieves the several objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described our invention, we claim as new and desire to secure by Letters Patent:

1. A combined sound and motion picture projector comprising a carrying case having one open side, a film handling unit including an exciter, an amplifier unit including a power pack, an audio amplifier, a pickup and an exciter supply, and a motor and lamp unit, each of said units having its own chassis, the chassis for the film handling unit including a vertical front panel and a horizontal base panel rigidly secured together at right angles to one another, said front panel extending across the open side of the case with the film handling elements of the first unit on the exposed face thereof, means to detachably secure the chassis of the amplifier unit and the chassis of the motor and lamp unit to said horizontal panel in back of the vertical panel, and means to secure the base panel to the carrying case.

2. A combined sound and motion picture projector comprising a carrying case having one open side, a film handling unit including an exciter, an amplifier unit including a power pack, an audio amplifier, a pickup and an exciter supply, a motor and lamp unit, each of said units having its own chassis, means to detachably secure the chassis of the last two mentioned units to the chassis of the first mentioned unit, said first-mentioned unit including a panel extending across the open side of the case, said first-mentioned unit having all the film handling elements thereof on the exposed face of the panel, said last two mentioned units being disposed at the back of said panel, and means to detachably secure the chassis of the first mentioned unit to the carrying case.

3. A combined sound and motion picture projector comprising a carrying case having one open side, a film handling unit including an exciter, an amplifer unit including a power pack, an audio amplifier, a pick up and an exciter supply, and a motor and lamp unit, each of said units having its own chassis, the chassis for the film handling unit including a vertical front panel which extends across the open side of the case, a horizontal base panel extending rearwardly from the front panel and means to rigidly secure said panels together in perpendicular relationship to one another, means to detachably secure the chassis of the amplifier unit and the motor and lamp unit to the base panel of the chassis of the film handling unit in back of the front panel, means to detachably secure the chassis of the film handling unit to the carrying case, a plurality of film handling means on the forward face of the front panel of the chassis for said unit, an actuating train for said plurality of means, said train being disposed at the back of said front panel, an operating element carried by the motor and lamp unit, and means to detachably couple said operating element to said actuating train whereby said operating element is removable with the motor and lamp unit.

4. A projector as set forth in claim 3 wherein the actuating train includes a rotary member and wherein the operating element also is a rotary member which is kinematically disengageable from the first named rotary member merely upon removal of the motor and lamp unit from the base panel.

5. A projector as set forth in claim 3 wherein the actuating train includes a sheave and wherein the operating element also is a sheave connected to the first mentioned sheave by an endless flexible member whereby the two sheaves are automatically kinematically disengaged upon removal of the motor and lamp unit from the base panel.

6. A projector as set forth in claim 3 wherein the actuating train includes a sheave, wherein the operating element also is a sheave connected to the first mentioned sheave by an endless flexible member, and wherein means is provided to take up the slack in said flexible member whereby the two sheaves are automatically kinematically disengaged upon removal of the motor and lamp unit from the base panel.

7. A projector as set forth in claim 3 wherein means is provided to detachably electrically connect the amplifier unit to the motor and lamp unit.

8. A projector as set forth in claim 3 wherein the exciter is mounted on the front panel, and wherein means is provided to detachably electrically connect said exciter to the exciter supply of the amplifier unit.

9. A projector as set forth in claim 3 wherein the front panel is provided with an opening and wherein a photo-electric cell is mounted on the amplifier unit and extends through said opening.

10. A projector as set forth in claim 3 wherein the front panel carries an exciter lamp and has an opening therein, wherein the amplifier unit has a photo-electric cell mounted thereon and extending through said opening, wherein the amplifier unit includes means for supplying a high frequency source of electric power, and wherein means is provided to detachably electrically connect said source and said exciter lamp.

11. A projector as set forth in claim 3 wherein the front panel carries an objective lens and wherein an optical system is provided to direct a beam of light from the motor and lamp unit to said objective lens.

12. In combination in a combined sound and motion picture projector, a film handling unit including an exciter and an amplifier unit including a power pack, an audio amplifier, a pickup and an exciter supply, each of said units having its own chassis, the chassis for the film handling unit including a vertical front panel, means to detachably secure the chassis of the amplifier unit to the chassis of the film handling unit, an opening in said panel, a photo-electric cell extending through said opening with the sensing element thereof forward of said panel, a socket provided on said amplifier unit adapted to receive said photo-electric cell, and a grommet of elastomeric material between the envelope of said photo-electric cell and the edge of said opening.

13. In combination in a combined sound and motion picture projector, a film handling unit including an exciter and an amplifier unit including a power pack, an audio amplifier, a pickup and an exciter supply, each of said units having its own chassis, the chassis for the film handling unit including a vertical front panel, means to detachably secure the chassis of the amplifier unit to the chassis of the film handling unit, an opening in said panel, a photo-electric cell extending through said opening with the sensing element thereof forward of said panel, a socket provided on said amplifier unit adapted to receive said photo-electric cell, and a metal sleeve attached to the amplifier chassis around the socket, said sleeve extending through said opening.

14. In combination in a combined sound and motion picture projector, a film handling unit including an exciter and an amplifier unit including a power pack, an audio amplifier, a pickup and an exciter supply, each of said units having its own chassis, the chassis for the film handling unit including a vertical front panel, means to detachably secure the chassis of the amplifier unit to the chassis of the film handling unit, an opening in said panel, a photo-electric cell extending through said opening with the sensing element thereof forward of said panel, a socket provided on said amplifier unit adapted to receive said photo-electric cell, and a grommet of elastomeric material filling the space between said sleeve and the edge of said opening.

OSMOND KENDALL.
SMILEY W. LOACH.

REFERENCES CITED

The following references are of record in the file of this patent:

UNITED STATES PATENTS

| Number | Name | Date |
|---|---|---|
| 1,873,016 | Oplinger et al. | Aug. 23, 1932 |
| 2,027,680 | Debrie | Jan. 14, 1936 |
| 2,031,608 | Kiel | Feb. 25, 1936 |
| 2,049,853 | Malickson | Aug. 4, 1936 |
| 2,114,608 | Ross | Apr. 19, 1938 |
| 2,127,143 | Ross | Aug. 16, 1938 |
| 2,163,263 | Simons | June 20, 1939 |
| 2,319,111 | Calvin et al. | May 11, 1943 |
| 2,322,369 | Lackoff et al. | June 22, 1943 |
| 2,382,116 | Victor | Aug. 14, 1945 |